(12) United States Patent
Fergusson

(10) Patent No.: US 7,689,489 B2
(45) Date of Patent: Mar. 30, 2010

(54) METHODS AND SYSTEMS FOR ASSISTING FINANCIAL SERVICES FIRMS AND THEIR REPRESENTATIVES

(76) Inventor: Scott Fergusson, 7914 Woodcreek La., Fort Wayne, IN (US) 46815

( * ) Notice: Subject to any disclaimer, the term of this patent is extended or adjusted under 35 U.S.C. 154(b) by 1963 days.

(21) Appl. No.: 09/917,120

(22) Filed: Jul. 27, 2001

(65) Prior Publication Data

US 2003/0023531 A1 Jan. 30, 2003

(51) Int. Cl.
*G06Q 40/00* (2006.01)
(52) U.S. Cl. .............................. 705/36; 705/39; 705/35
(58) Field of Classification Search .................. 705/35, 705/36, 39
See application file for complete search history.

(56) References Cited

U.S. PATENT DOCUMENTS

| | | | | |
|---|---|---|---|---|
| 5,590,197 A | * | 12/1996 | Chen et al. ..................... | 380/24 |
| 5,684,965 A | * | 11/1997 | Pickering ..................... | 395/234 |
| 5,826,243 A | | 10/1998 | Musmanno et al. ........... | 705/35 |
| 5,930,764 A | | 7/1999 | Melchione et al. ............ | 705/10 |
| 5,940,809 A | | 8/1999 | Musmanno et al. ........... | 705/35 |
| 5,978,779 A | | 11/1999 | Stein et al. .................... | 705/37 |
| 5,982,520 A | * | 11/1999 | Weiser et al. ................ | 359/172 |
| 6,009,415 A | * | 12/1999 | Shurling et al. ............... | 705/35 |
| 6,076,072 A | | 6/2000 | Libman ........................ | 705/34 |
| 6,122,635 A | | 9/2000 | Burakoff et al. ............ | 707/102 |
| 6,408,282 B1 | * | 6/2002 | Buist ......................... | 705/36 R |

OTHER PUBLICATIONS http://www.portfolioaudit.com/navigatorcg/corpNewsDetail.asp?id=23, "Corporate News-North American Software to Integrate Navigator Consulting Group's Compliance Solution", downloaded Sep. 25, 2001, 2 pages.
http://www.portfolioaudit.com/navigatorcg/corpNewsDetail.asp?id=15, "Corporate News-Navigator Consulting Group Announces portfolioAudit.com Web Site", downloaded Sep. 25, 2001, 1 page.
http://www.portfolioaudit.com/navigatorcg/corpNewsDetail.asp?id=21, "Corporate News-Navigator Consulting Group, Inc. and DataCow of Toronto Announce Development of Portfolio R.A.M. (Research Auditing & Monitor) Software"; downloaded Sep. 25, 2001, 2 pages.
http://www.portfolioaudit.com/navigatorcg/corpNewsDetail.asp?id=47, "Corporate News-Portfolio R.A.M. Software Now Available On-Line", downloaded Sep. 25, 2001, 1 page.

(Continued)

*Primary Examiner*—Daniel S Felten
(74) *Attorney, Agent, or Firm*—Greenberg Traurig, LLP

(57) ABSTRACT

Methods and systems are provided for assisting financial services firms and their representatives in efficiently managing their businesses, and in developing and maintaining strong customer service and loyalty. An integrated, preferably web based browser operated system is provided that uses one or more central databases to store customer, account, accounting, compliance, and other relevant information. Interfaces and tools are also provided for accessing the one or more central databases in a manner that is consistent with and supports how a representative actually works.

44 Claims, 28 Drawing Sheets

OTHER PUBLICATIONS http://www.portfolioaudit.com/navigatorcg/corpNewsDetail.asp?id=46, "Corporate News-Navigator Consulting Group Releases brokerAudit Application", downloaded Sep. 25, 2001, 1 page.
http://www.portfolioaudit.com/navigatorcg/corpNewsDetail.asp?id=48, "Corporate News-Securities North America/Complinet Reviews BrokerAudit", downloaded Sep. 25, 2001, 2 pages.
http://www.portfolioaudit.com/navigatorcg/corpNewsDetail.asp?id=52, "Corporate News-MJK Clearing, Inc. and Protegent, Inc. Announce Alliance to offer BrokerAudit™ to MJK Correspondent Broker-Dealers", downloaded Sep. 25, 2001, 2 pages.
http://www.brokeraudit.com/brokeraudit/pubilc/aboutbroker.asp, "BrokerAudit: About US-Highlights", downloaded Sep. 25, 2001, 3 pages.
http://www.mantas.com/solutions/equ_trd_comp.html, "The Mantas Equities Trading Compliance", downloaded Sep. 25, 2001, 2 pages.
http://www.siliconphilly.com/newletters/ar3_6_5.htm, "Mantas, Inc., Announces Funding and Management Team", downloaded Sep. 25, 2001, 7 pages.
http://www.mantas.com/solutions/solutions_advantage.html, "The Mantas Advantage" downloaded Sep. 25, 2001, 1 page.
http://www.mantas.com/solutions/best_execution.html, "Mantas Best Execution", downloaded Sep. 25, 2001, 2 pages.
http://www.mantas.com/solutions/fraud_ml_sec_firms.html, "Fraud and Money Laundering Detection for Securities Firms", downloaded Sep. 25, 2001, 2 pages.
http://www.mantas.com/solutions/solutions_faq.html, "Frequently Asked Questions", downloaded Sep. 25, 2001, 5 pages.
http://www.mantas.com/solutions/solutions_knowledge_disc.html, "The Mantas Knowledge Discovery Platform", downloaded Sep. 25, 2001, 2 pages.
http://www.investrack.com, "Freedom Track, Inc.", downloaded Apr. 30, 2001, 2 pages.
http://www.investrack.com/FT3k_Home.htm, "Freedom Track 3000", downloaded Apr. 30, 2001, 2 pages.
http://www.investrack.com/bd_ria_oversight.htm, "BD RIA Oversight", downloaded Apr. 30, 2001, 2 pages.
http://www.investrack.com/bd_back_office.htm, "BD Back Office", downloaded Apr. 30, 2001, 2 pages.
http://www.investrack.com/ft3k_3rd_generation.htm, "FT3k 3$^{rd}$ Generation", downloaded Apr. 30, 2001, 2 pages.
http://www.sungardss.com/ "SunGard Securities Systems-Home Page", downloaded Apr. 30, 2001, 1 page.
http://www.sungardss.com/html/products.htm, "SunGard Securities Systems, Products", downloaded Apr. 30, 2001, 2 pages.
http://www.sungardss.com/html/eindradlhtml, "EinTrader.com-The First Eback-Office Connection", downloaded Apr. 30, 2001, 2 pages.
http://www.sungardss.com/html/p_i_bo.htm, "InTrader-Back Office", downloaded Apr. 30, 2001, 3 pages.
http://www.sungardss.com/htmlp_i_st.htm, "InTrader-Software and Technology", downloaded Apr. 30, 2001, 2 pages.
http://www.sungardss.com/html/p_it_iv.htm, "InTrader-Investment Portfolio", downloaded Apr. 30, 2001, 3 pages.
http://www.sungardss.com/html/p_scs.htm, "SunGard Correspondent Services", downloaded Apr. 30, 2001, 2 pages.
http://www.sungardss.com/html/p_fitrac.htm, "FiTrac for InTrader and BOLT", downloaded Apr. 30, 2001, 2 pages.
http://www.sungardss.com/html/p_ssn.htm, "SunGard Solutions Network (SSN)", downloaded Apr. 30, 2001, 2 pages.
http://www.sungardss.com/html/p_exrpt.htm, "Investment Portfolio-Executive Reporting", downloaded Apr. 30, 2001, 2 pages.
http://www.sungardss.com/html/p_i_fo.htm, "InTrader-Front Office", downloaded Apr. 30, 2001, 3 pages.
http://www.sungardss.com/html/p_i_bd.htm, "InTrader-Broker-Dealer", downloaded Apr. 30, 2001, 3 pages.
http://www.sungardss.com/html/p_i_aa.htm, "InTrader-Alerts and Alarms", downloaded Apr. 30, 2001, 3 pages.
http://www.sungardss.com/html/p_i_rsm.htm, "InTrader-Remote Systems Management", downloaded Apr. 30, 2001, 2 pages.
http://www.sungardss.com/html/p_ipnet.htm, "SunGard Securities Systems-InTrader Investment Portfolio Services", downloaded Apr. 30, 2001, 2 pages.
http://www.sungardss.com/p_bt_ovr.htm, "BOLT-Overview", downloaded Apr. 30, 2001, 3 pages.
http://www.sungardss.com/html/p_bt_iv.htm, "BOLT-Investment Portfolio", downloaded Apr. 30, 2001, 2 pages.
http://www.sungardss.com/html/p_scs.htm, "SunGard Correspondent Services", downloaded Apr. 30, 2001, 2 pages.
http://www.sungardss.com/html/p_aps.htm, "SunGard Securities Systems-APS 2", downloaded Apr. 30, 2001, 4 pages.
http://www.advisortoday.com/archives/2001_february_mm.html, Janet C. Arrowood, "Managing Money: Taking the Sting out of an Audit", Feb. 2001, 3 pages.
http://www.finop.com/main.htm, "The FINOP Companies Home Page", downloaded Apr. 30, 2001, 2 pages.
http://www.finop.com/a.htm, "Historical Perspective-The FINOP Companies", downloaded Apr. 30, 2001, 4 pages.
http://www.finop.com/product.htm, "National FINOP, Inc.-A Product Description", downloaded Apr. 30, 2001, 1 page.
http://www.finop.com/tourmenu.htm, "FINOP SOFTWARE 'TOUR MENU'", downloaded Apr. 30, 2001, 1 page.
http://www.finop.com/m1.htm, "Access Current Period Trade Processing Files and Reports", downloaded Apr. 30, 2001, 1 page.
http://www.finop.com/m1-a.htm, "Access Trade Processing and Error Reports", downloaded Apr. 30, 2001, 1 page.
http://www.finop.com/m1-a1.htm, "Conventional 'Commissioned Based' Trade Processing", downloaded Apr. 30, 2001, 1 page.
http://www.finop.com/m1-a2.htm, "Process Direct Mutual Fund and Similar Trades:", downloaded Apr. 30, 2001, 1 page.
http://www.finop.com/m1-b.htm, "Trade Status an Error Reports", downloaded Apr. 30, 2001, 1 page.
http://www.finop.com/m1-c.htm, "Error Edit", downloaded Apr. 30, 2001, 1 page.
http://www.finop.com/m2.htm, "Access Current Period Principal (House) and K2I Blotters", downloaded Apr. 30, 2001, 1 page.
http://www.finop.com/m2-a.htm, "Principal Trade Blotters", downloaded Apr. 30, 2001, 1 page.
http://www.finop.com/m2-b.htm, "Principal Trade Blotters", downloaded Apr. 30, 2001, 1 page.
http://www.finop.com/m3.htm, "Access Agency and Riskless Blotters and Reports", downloaded Apr. 30, 2001, 1 page.
http://www.finop.com/m3-a.htm, "Access Agency and Riskless Blotters and Reports", downloaded Apr. 30, 2001, 1 page.
http://www.finop.com/m3-b.htm, "Access Agency and Riskless Blotter and Reports", downloaded Apr. 30, 2001, 1 page.
http://www.finop.com/m3-c.htm, "Access Agency and Riskless Blotter and Reports", downloaded Apr. 30, 2001, 1 page.
http://www.finop.com/m4.htm, "Access Underwriting Files and Reports", downloaded Apr. 30, 2001, 1 page.
http://www.finop.com/m4-a.htm, "Access Underwriting Files and Reports", downloaded Apr. 30, 2001, 1 page.
http://www.finop.com/m4-b.htm, "Access Underwriting Files and Reports", downloaded Apr. 30, 2001, 1 page.
http://www.finop.com/m4-c.htm, "Access Underwriting Files and Reports", downloaded Apr. 30, 2001, 1 page.
http://www.finop.com/m5.htm, "Access Reports From History", downloaded Apr. 30, 2001, 1 page.
http://www.finop.com/m5-a.htm, "Access Reports From History", downloaded Apr. 30, 2001, 1 page.
http://wwvv.finop.com/m5-b.htm, "Access Reports From History", downloaded Apr. 30, 2001, 1 page.
http://www.finop.com/m5-c.htm, "Access Reports From History", downloaded Apr. 30, 2001, 1 page.
http://www.finop.com/m6.htm, "Access System 'Set-Up' Files and Reports", downloaded Apr. 30, 2001, 1 page.
http://www.finop.com/m6-a.htm, "Access System 'Set-Up' Files and Reports", downloaded Apr. 30, 2001, 1 page.
http://www.finop.com/m6-b.htm, "Access Reports From History", downloaded Apr. 30, 2001, 1 page.

http://wwvv.finop.com/m6-c.htm, "Access Reports From History", downloaded Apr. 30, 2001, 1 page.

http://www.finop.com/m8.htm, "Special Applications and User Reports", downloaded Apr. 30, 2001, 1 page.

http://www.finop.com/m10.htm, "Delete Settled Transactions and Append to History", downloaded Apr. 30, 2001, 1 page.

* cited by examiner

Investigo Corp.

- 10 Most active accounts for <u>All Reps</u> for the month ending 01/31/2000

| Account Number | Client Name | Account Type | SSN |
|---|---|---|---|
| W636020323 | Diane Glosson | Regular IRA | 307-50-4245 |
| W636019051 | Richard Schreiber | Regular IRA | 305-38-3491 |
| 317-62-3670 | Stanley Gamble | 401(k) | 317-62-3670 |
| 308-70-8613 | Michael Saxman | 401(k) | 308-70-8613 |
| 385-82-2226 | Mark Reilly | 401(k) | 385-82-2226 |
| 305-60-3130 | Lee Humbert | 401(k) | 305-60-3130 |
| 312-82-2943 | Henry Gilbert | 401(k) | 312-82-2943 |
| 315-72-9043 | Kathy Lefever | 401(k) | 315-72-9043 |
| 60952972D | Stanley D. Gamble | 401(k) | 317-62-3670 |
| 60952996D | Mark L. Reilly | 401(k) | 385-82-2226 |

*FIG. 6*

Investigo Corp.

- 10 Most active accounts for Rep 3BR for the month ending 10/31/2000

| Account Number | Client Name | Account Type | SSN |
|---|---|---|---|
| W636080590 | David A. Story | Regular IRA | 303-52-5412 |
| FERG6 | Scott Fergusson | 401(k) | 304-96-1037 |
| W632319364 | Jeffrey L. Hinen | JTWROS | 308-82-8501 |
| W632014437 | Mr. James E. Lauritsen | DVP | 43-0497480 |
| 60688910 | Carolyn E. Hein | 403(b) | 307-46-5353 |
| 64747090 | Chelsey J. Coughlin | UGMA | 313-13-3668 |
| 64747091 | Bray J. Coughlin | UGMA | 310-19-2016 |
| FER5 | Scott Fergusson | Regular IRA | 304-96-1037 |
| W632297842 | Keith Edwards | JTWROS | 315-52-2906 |
| W636019770 | Kim A. Lefever | Regular IRA | 316-64-4482 |

FIG. 7

Investigo Corp.

- Check Deposit ledger for All for the Month ending 10/31/2000.

| Date Received | Account Number | Account Name | Amount | Deposit Date | Payable To | Represent |
|---|---|---|---|---|---|---|
| 10/1/2000 | C017254-0D | Keith D. Class | -900 | 10/1/2000 | Keith D. Class | 3AX |
| 10/2/2000 | 64923193 | Shawn D. Ferro | 150 | 10/2/2000 | fund | 3BR |
| 10/2/2000 | W636019127 | Shirley Clem | -540 | 10/2/2000 | Shirley Clem | 3AX |
| 10/2/2000 | W636019127 | Shirley Clem | -60 | 10/2/2000 | Shirley Clem | 3AX |
| 10/2/2000 | 65099328 | MaryJo LaVine | 510 | 10/2/2000 | Capital Bank & Trust | 3AX |
| 10/2/2000 | 65018634 | Kelly M. LaVine | -10 | 10/2/2000 | Kelly M. LaVine | 3AX |
| 10/2/2000 | 64955885 | Patricia A. Vilches | -10 | 10/2/2000 | Patricia A. Vilches | 3AX |
| 10/2/2000 | 64955885 | Patricia A. Vilches | 2010 | 10/2/2000 | Capital Bank & Trust | 3AX |
| 10/2/2000 | 65131336 | Mariano R. Vilches | -10 | 10/2/2000 | Mariano R. Vilches | 3AX |
| 10/2/2000 | 65131336 | Mariano R. Vilches | 2010 | 10/2/2000 | Capital Bank & Trust | 3AX |
| 10/2/2000 | W636019234 | Coryll Miller | -500 | 10/2/2000 | Coryll Miller | 3AX |
| 10/2/2000 | W636019085 | Ross Leakey | -520 | 10/2/2000 | Ross Leakey | 3AX |
| 10/2/2000 | 64924065 | Elizabeth E. Neuok | -300 | 10/2/2000 | Elizabeth E. Neuok | 3BR |
| 10/2/2000 | 64923194 | Heather A. Ferro | 125 | 10/2/2000 | fund | 3BR |
| 10/2/2000 | W636019697 | Gloria Weiler | -100 | 10/2/2000 | Gloria Weiler | 3AX |
| 10/2/2000 | W636020505 | Dean Mansdorfer | -850 | 10/2/2000 | Dean Mansdorfer | 3AX |
| 10/2/2000 | W636020513 | Nyla Mansdorfer | -350 | 10/2/2000 | Nyla Mansdorfer | 3AX |
| 10/2/2000 | W636020562 | Frank Erwin | -600 | 10/2/2000 | Frank Erwin | 3AX |
| 10/2/2000 | W636058851 | David B. Sensenich | -400 | 10/2/2000 | David B. Sensenich | 3AX |
| 10/2/2000 | W636081952 | Gary S. Hall | -350 | 10/2/2000 | Gary S. Hall | 3AX |
| 10/2/2000 | W638026435 | Dorothy M. Neuenschwander | -1500 | 10/2/2000 | Dorothy M. Neuenschwander | 3AX |
| 10/2/2000 | W638030924 | Alfred E. Boyer | -223.7 | 10/2/2000 | Alfred E. Boyer | 3AX |
| 10/2/2000 | W636019622 | Sophie Leakey | -200 | 10/2/2000 | Sophie Leakey | 3AX |
| 10/2/2000 | 64831677 | Doloris McCormick | -200 | 10/2/2000 | Doloris McCormick | 3AX |
| 10/2/2000 | W632293528 | Ellen Jackson | -5000 | 10/2/2000 | Ellen Jackson | 3AX |
| 9/30/2000 | W632628913 | William A. Oliver | 1000.00 | 10/2/2000 | Schroder & Co. | E6T |
| 10/2/2000 | W632669420 | Robert W. Schnipke | 200000 | 10/2/2000 | Schroder & Co | 3AX |
| 10/2/2000 | W632292801 | Mazie Welbaum | -249.36 | 10/2/2000 | Mazie Welbaum | 3AX |

FIG. 8

Investigo Corp.

Trade Buy Blotter for All for dates 10/1/2000 to 10/31/2000

| Trade Date | Settle Date | Buy / Sell | Account Number | Product | Shares | S/UNS | Buy Price | Buy Cost | Buy Commission |
|---|---|---|---|---|---|---|---|---|---|
| 10/1/2000 | 10/4/2000 | Buy | W632293452 | C017254-00 | 60327.84 | Unsolicited | 1 | 0 | 0 |
| 10/2/2000 | 10/5/2000 | Buy | W632669420 | IALAX | 3603.604 | Solicited | 15.54 | 56000 | 0 |
| 10/2/2000 | 10/5/2000 | Buy | W632669420 | IDGSX | 1689.708 | Solicited | 13.02 | 22000 | 0 |
| 10/2/2000 | 10/5/2000 | Buy | W632669420 | RCVAX | 1756.44 | Solicited | 17.08 | 30000 | 0 |
| 10/2/2000 | 10/5/2000 | Buy | W632667689 | LEIFX | 0.194 | Solicited | 22.5 | 0 | 0 |
| 10/2/2000 | 10/5/2000 | Buy | W632665626 | RCVAX | 51.317 | Solicited | 16.58 | 0 | 0 |
| 10/2/2000 | 10/5/2000 | Buy | W632658555 | RCVBX | 11.881 | Solicited | 16.61 | 0 | 0 |
| 10/2/2000 | 10/5/2000 | Buy | W632588893 | RCVGX | 7.324 | Solicited | 16.57 | 0 | 0 |
| 10/2/2000 | 10/5/2000 | Buy | W632541066 | BETM | 300 | Solicited | 0.4375 | 187.6 | 50 |
| 10/2/2000 | 10/5/2000 | Buy | W632499077 | LEIBX | 0.135 | Solicited | 22.5 | 0 | 0 |
| 10/2/2000 | 10/5/2000 | Buy | W632467411 | QQQ | 70 | Solicited | 88.5 | 6333.44 | 132.09 |
| 10/2/2000 | 10/5/2000 | Buy | W632448502 | RCVGX | 16.242 | Solicited | 16.57 | 0 | 0 |
| 10/2/2000 | 10/5/2000 | Buy | W632448672 | RCVGX | 47.063 | Solicited | 16.57 | 0 | 0 |
| 10/2/2000 | 10/5/2000 | Buy | W632367389 | RCVBX | 21.917 | Solicited | 16.61 | 0 | 0 |
| 10/2/2000 | 10/5/2000 | Buy | W632369420 | OPPAX | 485.784 | Solicited | 69.99 | 34000 | 0 |
| 10/2/2000 | 10/5/2000 | Buy | W632356945 | LEIFX | 1.342 | Solicited | 22.5 | 0 | 0 |
| 10/2/2000 | 10/5/2000 | Buy | W632322475 | RCVAX | 40.796 | Solicited | 16.58 | 0 | 0 |
| 10/2/2000 | 10/5/2000 | Buy | W632312656 | AHITX | 3.706 | Solicited | 12.97 | 0 | 0 |
| 10/2/2000 | 10/5/2000 | Buy | W632306858 | NABGX | 13.93 | Solicited | 15.04 | 0 | 0 |
| 10/2/2000 | 10/5/2000 | Buy | W632297412 | LEIBX | 0.292 | Solicited | 22.5 | 0 | 0 |
| 10/2/2000 | 10/5/2000 | Buy | W632297347 | KO | 0.62 | Solicited | 54.937 | 34.22 | 0 |
| 10/2/2000 | 10/5/2000 | Buy | W632295523 | FDBBX | 17.202 | Solicited | 8.79 | 0 | 0 |

FIG. 9

Investigo Corp.

- Daily Trade Tickets for the Period 10/1/2000 to 10/31/2000 for All.

| Trade Date | Settle Date | Buy/Sell | Account Number | Product | Shares | S/UNS | Type | Price | Report | Rep |
|---|---|---|---|---|---|---|---|---|---|---|
| 10/2/2000 | 10/5/2000 | Buy | W632669420 | 45168H105 | 2001.8200 | Solicited | Cash-01 | market | 10.99 | 3AX |
| 10/2/2000 | 10/5/2000 | Sell | W632319364 | RHAT | 500 | Unsolicited | Cash-01 | mkt | 17 1/16 | 3BR |
| 10/2/2000 | 10/5/2000 | Buy | W632467411 | QQQ | 70 | Unsolicited | Cash-01 | 88 1/2 gtc | 88 1/2 | 3BR |
| 10/2/2000 | 10/5/2000 | Sell | W632319364 | NOIZ | 600 | Unsolicited | Cash-01 | mkt | 7 1/16 | 3BR |
| 10/2/2000 | 10/5/2000 | Buy | W632341066 | BETM | 300 | Unsolicited | Cash-01 | market | .4375 | 3AX |
| 10/2/2000 | 10/5/2000 | Sell | W632319364 | TRCR | 800 | Unsolicited | Cash-01 | 3 11/16 | | 3BR |
| 10/2/2000 | 10/5/2000 | Buy | W632669420 | IALAX | 3603.6040 | Solicited | Cash-01 | market | 15.54 | 3AX |
| 10/2/2000 | 10/5/2000 | Buy | W632669420 | 45168C437 | 1689.7080 | Solicited | Cash-01 | market | 13.02 | 3AX |
| 10/2/2000 | 10/5/2000 | Buy | W632669420 | OIGAX | 419.8150 | Solicited | Cash-01 | 0 | 23.82 | 3AX |
| 10/2/2000 | 10/5/2000 | Buy | W632669420 | OPMSX | 1635.2200 | Unsolicited | Cash-01 | market | 15.90 | 3AX |
| 10/3/2000 | 10/6/2000 | Buy | W636047672 | ANWPX | 2471.6500 | Solicited | Cash-01 | market | 29.63 | 3AX |
| 10/3/2000 | 10/6/2000 | Buy | W636047672 | AEPGX | 1580.8760 | Solicited | Cash-01 | market | 39.48 | 3AX |
| 10/3/2000 | 10/6/2000 | Sell | W636047672 | IVINX | 1707.1350 | Solicited | Cash-01 | market | 36.68 | 3AX |
| 10/3/2000 | 10/6/2000 | Sell | W636047672 | 220714305 | 5274.570 | Solicited | Cash-01 | 1 | 1 | 3AX |
| 10/3/2000 | 10/6/2000 | Buy | W632669420 | RCVAX | 1756.4400 | Solicited | Cash-01 | market | 17.08 | 3AX |
| 10/3/2000 | 10/6/2000 | Buy | W632669420 | OPPAX | 485.7840 | Solicited | Cash-01 | market | 69.99 | 3AX |
| 10/3/2000 | 10/6/2000 | Sell | W636047672 | NEFDX | 4282.7230 | Solicited | Cash-01 | market | 17.10 | 3AX |
| 10/3/2000 | 10/6/2000 | Buy | W636020430 | LU | 100 | Unsolicited | Cash-01 | 30.25 | GTC | 3AX |
| 10/3/2000 | 10/6/2000 | Sell | W632295424 | LEH | 1000 | Unsolicited | Cash-01 | 160 | GTC | 3AX |
| 10/4/2000 | 10/7/2000 | Sell | W636020305 | FKINX | 7824.9490 | Solicited | Cash-01 | market | 2.31 | 3AX |

FIG. 10

Mail Merge

Create a custom mail merge file by defining the characteristics of the accounts:

By Account Registration

| | |
|---|---|
| Representative | 3BR |
| Account Type | 401(k) |
| Report Frequency | All |
| State of Residence | Minnesota |

By Investment Objective

| | | |
|---|---|---|
| ☐ LT Capital Appreciation | Stocks | Don't Search |
| ☐ Short Term Trading | Bonds | Don't Search |
| ☑ Business Man's Risk | Options | Don't Search |
| ☐ Income | Futures | Don't Search |
| ☐ Safety of Principal | | |
| ☐ Tax Exempt Income | | |

By Personal Interests

☑ Golf      ☐ Tennis

By Holdings

☑ Owns Mutual Funds      ☐ Owns Long Term Care Policies
☐ Owns Life Insurance      ☐ Owns Variable Annuities

[____] Symbol      [Create Mail Merge]

*FIG. 11*

Investigo Corp.      4/27/2001

Symbol: | Compliance -- Daily | Account Search:

Cross Reference for Cisco Systems Inc.

List of Open Positions for CSCO, Currently Trading at 16.17 for Representative (3BR). To go to a specific account click on the Account Number. To sell a specific position, click on the Shares.

Cisco Systems Inc.-- (CSCO) at 16.17

180 — Mail Merge

| Account Number | Last Name | Symbol | Shares | Open Date | Avg. Price | Total Cost | P/L | Contact #'s |
|---|---|---|---|---|---|---|---|---|
| W632297834 | Boval | CSCO | 100 | 7/12/1999 | 33.8135 | $3,381.35 | ($1,764.35) | W:219-825-9457<br>H:219-825-5520 |
| W632298345 | Edwards | CSCO | 195 | 3/24/2000 | 69.8983 | $13,630.16 | ($10,477.01) | W:<br>H:219-635-2496 |
| W636098170 | Felber | CSCO | 100 | 1/5/2000 | 50.6402 | $5,064.02 | ($3,447.02) | W:<br>H: |
| W632297107 | Kernen | CSCO | 103 | 4/18/2000 | 68.1096 | $7,015.29 | ($5,349.78) | W:800-392-0844e272<br>H:770-967-4053 |
| W632392841 | Marques | CSCO | 600 | 2/4/1999 | 29.6721 | $17,803.26 | ($8,101.26) | W:219-357-6557<br>H:219-357-5252 |
| W632488060 | Mason | CSCO | 238 | 10/7/1999 | 47.0749 | $11,203.83 | ($7,355.37) | W:219-925-4939<br>H:219-837-6070 |
| W632494886 | McClain | CSCO | 200 | 7/15/1999 | 33.3484 | $6,669.68 | ($3,435.68) | W:219-425-5792<br>H:219-497-0740 |
| W632520656 | Rienks | CSCO | 110 | 7/21/1999 | 46.9189 | $5,161.08 | ($3,382.38) | W:270-251-1263<br>H:270-554-4701 |
| W632645099 | Silva | CSCO | 20 | 3/23/2000 | 79.883 | $1,597.66 | ($1,274.26) | W:270-251-1109<br>H:270-554-5384 |

FIG. 14

Investigo Corp. 4/27/2001

| Symbol: | ❓ | Compliance -- Daily | Account Search: | ❓ |

📁 JDEMO   Joseph Client-- IRA Rollover ~Tell Me about...

Information
123 West Main Street
P.O. Box 12345
Fort Wayne, IN 46804
☎ 219-555-1212 (H)
☎ 219-555-1234 (W)
✉ joe@investigo.net

Action
Appraisal ▼
Date: 4/26/2001  [Go]
Trade: Buy ▼ [Go]

Administration
Edit Account Information [Go]
Edit Open ▼ Transactions [Go]
Make a Cash Deposit ▼ [Go]

Holdings

| Quantity | Symbol | Date Open | Unit Price | Net Cost | Market Price | Market Value | Gain/Loss |
|---|---|---|---|---|---|---|---|
| 1644.196 | AGTHX | 1/2/2001 | 30.410 | $50,000.00 | 24.53 | $40,332.13 | ($9,667.87) |
| 3445.256 | AMUSX | 3/10/1999 | 12.539 | $43,200.00 | 13.18 | $45,408.49 | $2,208.49 |
| 3267.403 | ANEFX | 4/8/1999 | 22.954 | $75,000.00 | 20.43 | $66,753.04 | ($8,246.96) |
| 2315.196 | ANWPX | 5/17/1999 | 24.058 | $55,700.00 | 23.27 | $53,874.62 | ($1,825.38) |
| 1834.733 | AWSHX | 3/15/1999 | 24.594 | $45,124.02 | 28.97 | $53,152.24 | $8,028.22 |
| 1111.652 | MSIGX | 3/10/1999 | 38.861 | $43,200.00 | 33.9 | $37,685.00 | ($5,515.00) |
| 2335.793 | PIVAX | 4/30/1999 | 32.109 | $75,000.00 | 29.27 | $68,368.67 | ($6,631.33) |
| 394.22 | STIF | 6/30/2000 | 1.000 | $394.22 | 1 | $394.22 | $0.00 |

Total Equity: $365,968.36

Objectives
Long Term Cap App. ✔
Short Term Trading
Business Man's Risk
Income ✔
Safety of Principal
Tax-Exempt Income

Personal
SSN#: 123-45-6789
Birthday: 12/31/1940
Employer: GTE
Occupation: Technician
Net Worth: 500K+
Liquid Net Worth: 500K+

Contact History

| Date | Type | Notes |
|---|---|---|
| 4/27/2001 | Telephone ▼ | Create New [Go] |
| 4/26/2001 | ☎ | Spoke with Joe regarding.... |

View JDEMO's Contact History

Investigo Corp.
4/27/2001

| Symbol: | | Compliance -- Daily | | Account Search: | |

☐ JDEMO    Joseph Client-- IRA Rollover ~Tell Me about...

Information
123 West Main Street
P.O. Box 12345
Fort
Wayne, IN 46804
☎219-555-1212 (H)
☎219-555-1234 (W)
✉ joe@investigo.net

Action
Realized G/L ▼
- Appraisal
- Appraisal Graph
- Asset Allocation
- Asset Alloc. Graph
- Realized G/L
- Performance

[Go] [Go]

Administration
Edit Account Information [Go]
Edit Open ▼ Transactions [Go]
Make a Cash Deposit ▼ [Go]

Holdings

| Quantity | Symbol | Date Open | Unit Price | Net Cost | Market Price | Market Value | Gain/Loss |
|---|---|---|---|---|---|---|---|
| 1644.196 | AGTHX | 1/2/2001 | 30.410 | $50,000.00 | 24.53 | $40,332.13 | ($9,667.87) |
| 3445.256 | AMUSX | 3/10/1999 | 12.539 | $43,200.00 | 13.18 | $45,408.49 | $2,208.49 |
| 3267.403 | ANEFX | 4/8/1999 | 22.954 | $75,000.00 | 20.43 | $66,753.04 | ($8,246.96) |
| 2315.196 | ANWPX | 5/17/1999 | 24.058 | $55,700.00 | 23.27 | $53,874.62 | ($1,825.38) |
| 1834.733 | AWSHX | 3/15/1999 | 24.594 | $45,124.02 | 28.97 | $53,152.24 | $8,028.22 |
| 1111.652 | MSIGX | 3/10/1999 | 38.861 | $43,200.00 | 33.9 | $37,685.00 | ($5,515.00) |
| 2335.793 | PIVAX | 4/30/1999 | 32.109 | $75,000.00 | 29.27 | $68,368.67 | ($6,631.33) |
| 394.22 | STIF | 6/30/2000 | 1.000 | $394.22 | 1 | $394.22 | $0.00 |

Total Equity: $365,968.36

Objectives
- Long Term Cap App. ✔
- Short Term Trading
- Business Man's Risk
- Income ✔
- Safety of Principal
- Tax-Exempt Income

Personal
SSN#: 123-45-6789
Birthday: 12/31/1940
Employer: GTE
Occupation: Technician
Net Worth: 500K+
Liquid Net: 500K+

Contact History

| Date | Type | Notes |
|---|---|---|
| 4/27/2001 | Telephone ▼ | Create New [Go] |
| 4/26/2001 | ☎ | Spoke with Joe regarding.... |

View JDEMO's Contact History

*FIG. 18*

Joseph Client
123 West Main Street
Fort Wayne, IN 46804

Account No.: JDEMO
IRA Rollover
Tax ID: 123-45-6789
Page: 1 of 1

Realized Gains and Losses From 1/1/2000 To 4/26/2001

| Quantity | Date Bought | Unit Price | Net Cost | Date Sold | Unit Price | Proceeds | Short Term Profit | Short Term Loss | Long Term Profit | Long Term Loss |
|---|---|---|---|---|---|---|---|---|---|---|
| AWSHX American-Washington Mutual Inv A | | | | | | | | | | |
| 1007.388 | 03/15/1999 | 34.9600 | 35218.28 | 04/03/2000 | 29.7800 | 30000.00 | 0.00 | 0.00 | 0.00 | -5218.28 |
| 1677.852 | 03/15/1999 | 34.9600 | 58657.70 | 05/23/2000 | 29.8000 | 50000.00 | 0.00 | 0.00 | 0.00 | -8657.70 |
| | | TOTALS: | | | | 80000.00 | 0.00 | 0.00 | 0.00 | -13875.98 |
| | | | | NET: | | | | 0.00 | | -13875.98 |

Investigo Corp.

Symbol: [____] Go | Compliance -- Daily | Account Number or Name: [____] Lookup | 4/27/2001

Trade Entry

JDEMO    Joseph Client -- IRA Rollover

| | | | |
|---|---|---|---|
| Trade Date | 4/27/2001 | Trade Type | Buy |
| Amount | 1000 | Symbol or CUSIP | INTERNATIONAL BUSINESS MACHINES COR (IBM) |
| Price | $600.00 | Solicitation Status | Solicited |
| Commission | $65.00 | Location of Shares | Long |
| Fees and/or charges | $665.00 | Reinvest | None |
| Sales charge | 0 | | |
| Total Fees | $665.00 | | |
| Total Cost | $33,665.00 | | |
| Order Entered By | 3br | | |
| Notes | Recommended to client | | |

[ Execute this Buy Order ] — 272

IRREVOCABLE STOCK OR BOND POWER

FOR VALUE RECEIVED, the undersigned does (do) hereby sell, assign, and transfer to Joseph Client   SSN#: 123-45-6789
123 West Main Street
Fort Wayne, IN 46804

If Stock, Complete This Portion
( 15 shares of the Common stock of INTERNATIONAL BUSINESS MACHINES COR (ibm)
( represented by Certificate(s) No(s) 12232293 inclusive,
( (Standing in the name of the undersigned on the books of said Company.

If Bonds, Complete This Portion
( _____ bonds of _____
( in the principal amount of $_____ No(s) _____ inclusive,
( standing in the name of the undersigned on the books of said company.

The undersigned does (do) hereby irrevocably constitute and appoint _____ attorney to transfer the said stock or bond(s), as the case may be, on the books of said Company, with full power of substitution in the premises.

Dated: 4/27/2001

IMPORTANT-READ CAREFULLY
The signatures(s) to this Power must correspond with the name(s) as written upon the face of the certificate(s) or bond(s) in every particular without alteration or enlargement or any change whatever. Signature guarantee should be made by a member or member organization of the New York Joseph Client

SIGNATURE GUARANTEED

*FIG. 25*

Investigo Corp.

Symbol: [ ] | Compliance -- Daily | Account Number or Name: [ ] | 4/27/2001

Specific Trades for ANEFX, American-New Economy Fund

Here are the Open trades for JDEMO. To edit the trade, click on the trade ID.

To Sell a Specific Position, Click on the Share Amount.

To delete a trade, click on the trash can icon.

To edit ANEFX's database entry, click here.

| Trade ID | Buy Date | Symbol | Shares | Buy Price | Buy Cost | Delete? |
|---|---|---|---|---|---|---|
| 128295 | 4/8/1999 | ANEFX | 2910.361 | 25.77 | $75,000.00 | 🗑 |
| 128262 | 6/18/1999 | ANEFX | 4.498 | 25.88 | $0.00 | 🗑 |
| 128272 | 12/14/1999 | ANEFX | 352.544 | 27.45 | $0.00 | 🗑 |

*FIG. 26*

Investigo Corp. 4/27/2001

Correspondence History for JDEMO

| Date | Type | Enterer | Notes |
|---|---|---|---|
| 4/26/2001 | 📇 | Joe | Spoke with Joe regarding the account. He is satisfied so far. Check back next month. |
| 4/11/2001 | 📅 | Joe | Met with Joe and discussed his account. Check back in 3 months. |
| 2/21/2001 | ✉️ | Joe | Sent him an appraisal and a realized g/l statement for |

*FIG. 27*

METHODS AND SYSTEMS FOR ASSISTING FINANCIAL SERVICES FIRMS AND THEIR REPRESENTATIVES

CROSS-REFERENCE TO CO-PENDING PATENT APPLICATIONS

This Application is related to co-pending U.S. patent application Ser. No. 09/917,447, filed Jul. 27, 2001 entitled "Methods And Systems For Providing A Measure Of Supervision Over The Activities Of Representatives Of A Business" and U.S. patent application Ser. No. 09/916,951, filed Jul. 27, 2001, entitled "Methods and Systems for Monitoring the Efficacy of a Marketing Project", both of which are incorporated herein by reference.

FIELD OF THE INVENTION

The present invention generally relates to the financial services industry, and more particularly, to methods and systems for assisting financial services firms and their representatives in the operation of their businesses.

BACKGROUND OF THE INVENTION

The distribution model used by the financial services industry to move investment products often begins with the DTCC (Depository Trust Clearing Corporation—formerly NSCC). The DTCC clears a majority of the investment market's equity, debt and mutual fund trades. Additionally, the DTCC clears some industry insurance transactions. Financial services firms such as Broker Dealers, who transact business through the DTCC, must either be a Clearing Broker Dealer or a correspondent to a Clearing Broker Dealer. Clearing Broker Dealers generally have systems that facilitate trading with the DTCC.

There are various types of Broker Dealers, including for example, insurance based Broker Dealers, bank based Broker Dealers, independent Broker Dealers, specialty niche Broker Dealers, and others. Insurance-based Broker Dealers have evolved to support the distribution of variable life and annuity products. In some cases, the insurance based Broker Dealers have grown to be quite sophisticated in order to attract sales professionals to sell not only the insurer's products, but other investment products.

Changes in legislation have allowed bank-based Broker Dealers to grow and acquire similar entities. As such, bank based Broker Dealers have become more sophisticated over time. They continue to attract representatives from wire house firms (i.e., Merrill Lync®, Paine Webber®, etc.), and train their representatives to focus on cross-selling bank and bank-related financial services. The cross-selling nature of their business requires the focus of referral tracking (identifying who in the bank or division referred the customer to the representative).

Independent Broker Dealers have been formed over time to provide a vehicle for successful registered representatives who have built their businesses through the traditional wire house environment. These successful professionals are attracted to the independent Broker Dealers because of an enhanced payout schedule. They are, however, often disappointed by the technological solutions provided by the Independent Broker Dealers. Affiliate offices are typically tied to independent Broker Dealers.

Specialty niche Broker Dealers have been formed to support vertically aligned specialty firms such as accountancy corporations and consumer and mortgage loan providers. These professionals attempt to cross sell their primary customers additional investment products.

Over the past few decades, the development and use of computers and computer technology to help manage the business of the larger financial service firms has grown rapidly. Smaller Broker Dealers have been left behind, however, because the commercially available technology solutions are simply cost prohibitive. Also during this period, the number of products offered by the financial services firms have increased substantially. Many of the product offerings were added in an incremental fashion, over an extended period of time. Consistent therewith, the software products developed to support the various product offerings were also incrementally developed. The legacy of this environment is a group of rather expensive yet powerful software applications that operate and are accessible primarily independently of one other, resulting in multiple standards, redundant files, and often data errors and failed system cross-processing. In many cases, such systems have caused significant harm to customer relationships and firm reputations.

What would be desirable, therefore, is a more affordable integrated system that assists financial services firms such as Broker Dealers in efficiently managing their businesses, and developing and maintaining strong customer service and loyalty.

SUMMARY OF THE INVENTION

The present invention provides methods and systems for assisting financial services firms and their representatives in efficiently managing their businesses, and in developing and maintaining strong customer service and loyalty. In a preferred embodiment, this is accomplished by providing an integrated system that uses a central database to store customer, account, accounting and other relevant information. Interfaces and tools are then provided for accessing the central database in a manner that is consistent with and supports how a representative actually works.

In one example, when a representative is analyzing or discussing a customer's portfolio, it is highly desirable to have ready access to all of the customer account information. It is also highly desirable to be able to combine certain accounts "on the fly", such as several business accounts, or all family accounts including 401K accounts. To accomplish this, and in accordance with one illustrative embodiment of the present invention, the representative is allowed to create a data structure that has one or more associated links. The data structure can be thought of as a "household" account, although it does not have to be associated with a customer's "household", nor does it preferably contain any actual account data. Instead, the "household" account can be arbitrarily defined, and preferably only includes a number of links that identify or point to other accounts within the system. The links are preferably defined by the representative. Once defined and selected, the present invention may display the account items that are within the accounts identified by the one or more links of the household account data structure. The household accounts may be saved for later reference and use.

It is contemplated that the "household" accounts may link, point to, or pull in data from two or more databases. For example, a remote database may include account or other information for a remote brokerage house, bank or the like. In this example, the "household" account may link, point to, or pull in account information from the remote database, if desired. This illustrates that the "household" accounts may include references to both local and remote databases, if desired.

To provide a degree of hierarchy, it is contemplated that a household account may include a link to other household accounts. Such a data structure may be called a household-of-households account. When a household-of-households account is selected, the present invention preferably displays the account items within the accounts identified by the one or more links of the household-of-households account, as well as the account items within the one or more accounts identified by the links in the identified sub-household account or accounts. Multiple levels of household-of-household accounts may be created, providing maximum flexibility to the representative. An advantage of using a data structure that only includes links rather than actual account data is that the displayed account items are collected from the actual accounts at the time of display, and are therefore up-to-date. For this reason, the household (and household-of-household) accounts can be thought of as dynamic links. Household-of-household accounts are often referred to herein simply as household accounts.

To simplify the display of account items, related account items from the various accounts identified by a household account may be combined before the data items are displayed. Example account items that may be combined include, for example, stock positions in a particular company. To do this, the account items that are related must first be identified. Then, the account items may be combined by, for example, summing the stock positions for a particular company, and outputting a single account item for display. In this example, an average or effective purchase price for the stock may be computed and also displayed. By combining related account items, the number of account items that are displayed may be reduced, and a more clear picture of the particular emphasis of the customer's portfolio can be seen. It is contemplated that various reports may also be run on the individual accounts or the household accounts, as desired.

To improve the efficiency of a representative in contacting or marketing to various customers, it is contemplated that a search function can be used to identifying database entries that have one or more fields that match a search query or expression. In one example, the account database may be part of a relational database that has one or more accounts for each customer. Each account may have a number of fields including, for example, the customer's name, the customer's address, the customer's birth date, the customer's past and current stock holdings, the number of shares of each stock owned, the purchase price of each stock, the current price of each stock, the customer's net worth, hobbies and interests of the customer, etc. The representative may identify those customers that have one or more fields that match a desired query or expression.

For example, a representative may wish to identify all customers that have a birthday in March. Alternatively, the representative may wish to identify all customers that hold a particular stock, have a net worth greater than $500,000 and are interested in Golf. By entering an appropriate query or expression, typically through a designated menu, the appropriate customers can be identified.

Once identified, the present invention may provide a formatted output that includes, for example, the identified customers' names and addresses. The formatted output can be formatted as a merge file that can be read by another program that has a merge capability (such as Microsoft Word®). The merge capability can be used to insert the outputted fields into designated locations within a letter or promotional item, which can then be sent to the identified customers. The formatted output can also be formatted for a spreadsheet program, or to print on printed labels, as desired. Other formats are also contemplated including, for example, formats that are compatible with e-mail systems or personal digital assistants (PDAs).

To further improve the efficiency of the representative, a stock deposit function may be provided. In many small Broker Dealer firms, performing a stock deposit can be a time consuming, error prone, and tedious task. During a typical stock deposit, the representative receives the stock from the customer, retrieves a copy of a stock power from paper files, completes the stock power, provides the customer with a receipt, and manually enters the received stock in the blotter of the firm. The present invention may substantially simplify this process. In one illustrative embodiment, the representative merely selects or creates a customer account in the system, enters the number of shares to be deposited with the firm, a company identifier for the stock, and one or more stock certificate numbers. The system then automatically generates a stock power that can be readily printed. The system may also create an entry in the appropriate customer account, and enter a stock deposit entry in the firm blotter, if desired. This may significantly reduce the time required to process a stock deposit, and may reduce errors that might otherwise occur.

For many representatives, customer referrals are a primary source of business. Therefore, the present invention contemplates tracking the productivity of customer referrals to help increase the representatives business. The productivity of customer referrals may be tracked in any number of ways. In one illustrative embodiment, the productivity of customer referrals is tracked by storing a customer referral source identifier for each referred customer. A total number of customer referrals for each customer referral source is then determined, along with an average number of customer referrals across all customer referral sources. A measure of relative productivity can then be determined for any particular customer referral source by comparing the total number of customer referrals for the particular customer referral source against the average number of customer referrals across all customer referral sources. The referral productivity of a particular customer is preferably displayed when the customer's account is accessed.

Alternatively, or in addition, the present invention may identify those customer referral sources that are particularly productive, such as those that have a total number of customer referrals that exceed the average customer referrals, those that are in the top ten of customer referral sources, or those that are in the top "n" percent of productivity. If desired, the present invention may output a formatted output that includes the particularly productive customer referral sources. The representative may then use the formatted output to generate, for example, a thank your letter or an invitation to a special event.

Because some customer referrals generate more commission than others, the present invention may track the productivity of customer referrals by commissions received, rather than by the total number of referrals. To do this, the present invention may determine a total dollar amount of commissions received from customers referred to the representative or firm by each customer referral source. Then, an average dollar amount may be computed for all customer referral sources. A measure of the relative productivity of any given customer referral source can then be determined by comparing the total dollar amount of commissions for a selected customer referral source against the average dollar amount received across all customer referral sources. Alternatively, or in addition, the present invention may identify those customer referral sources that are, for example, in the top "n" percent of productivity, as described above.

When a representative receives a call from a customer or wants to review a customers account, it is desirable to have ready access to the customer's investment objectives, recent customer contacts, and other information such as the customer's current holdings. Accordingly, the present invention contemplates displaying on a single screen or window, or several screens or windows simultaneously, the investment objectives and selected previously documented customer contacts. The present invention also contemplates displaying on the same screen or window selected account holdings, and a number of personal information fields. A report generator option interface, a securities trade option interface, and/or a deposit option interface may also be displayed on the same screen or window. In aggregate, these represent the primary information sources that a representative needs to efficiently service a customer's needs and create significant customer satisfaction and loyalty.

BRIEF DESCRIPTION OF THE DRAWINGS

FIG. 6 is a screen shot of an illustrative window that may be displayed when the "Most active" button (for all Reps) in FIG. 5 is selected;

FIG. 7 is a screen shot of an illustrative window that may be displayed when the "Most active" button (for Rep 3BR) in FIG. 5 is selected;

FIG. 8 is a screen shot of an illustrative window that may be displayed when the "Deposits" button under the Compliance Ledgers section of FIG. 5 is selected;

FIG. 9 is a screen shot of an illustrative window that may be displayed when the "Trades" button under the Compliance Ledgers section of FIG. 5 is selected;

FIG. 10 is an illustrative screen shot that may be displayed when the "Daily Tickets" button under the Compliance Ledgers section of FIG. 5 is selected;

FIG. 11 is a screen shot of an illustrative window that may be displayed when the "Mail Merge" hyperlink under the Investigo Functions section of FIG. 5 is selected;

FIG. 14 is a screen shot showing an illustrative window that may be displayed when the "Go" button of FIG. 13 is selected;

FIG. 17 is a screen shot showing an illustrative window that may be displayed when the hyperlink "JDEMO" is selected in FIG. 16;

FIG. 18 is a screen shot showing the illustrative window of FIG. 17 with the report menu expanded;

FIG. 19 is a screen shot of an illustrative window that may be displayed when the "Realized G/L" report is selected in FIG. 18;

FIG. 20 is a screen shot showing the illustrative window of FIG. 17 with the trade menu expanded;

FIG. 21 is a screen shot of an illustrative window that may be displayed when "Buy" is selected from the trade menu of FIG. 20;

FIG. 22 is a screen shot of an illustrative window that may be displayed when the "Confirm This Trade" button of FIG. 21 is selected;

FIG. 24 is a screen shot of an illustrative window that may be displayed when the "Make a Stock Deposit" menu option of FIG. 23 is selected;

FIG. 25 is a screen shot of an illustrative window that may be displayed when the "Generate Stock Power" button of FIG. 24 is selected;

FIG. 26 is a screen shot of an illustrative window that may be displayed when the "ANEFX" hyperlink of FIG. 17 is selected;

FIG. 27 is a screen shot of an illustrative window that may be displayed when "View JDEMO's Contact History" hyperlink of FIG. 17 is selected.

DETAILED DESCRIPTION OF THE INVENTION

The present invention is described below primarily with respect to Broker Dealer firms. The present invention is, however, equally applicable to other financial services firms including banks, insurance companies, consumer finance organizations, wire houses, etc. More generally, the present invention is applicable to any firm or business that has representatives, and may be useful in efficiently managing their businesses and in developing and maintaining strong customer service and loyalty.

Figure 1:
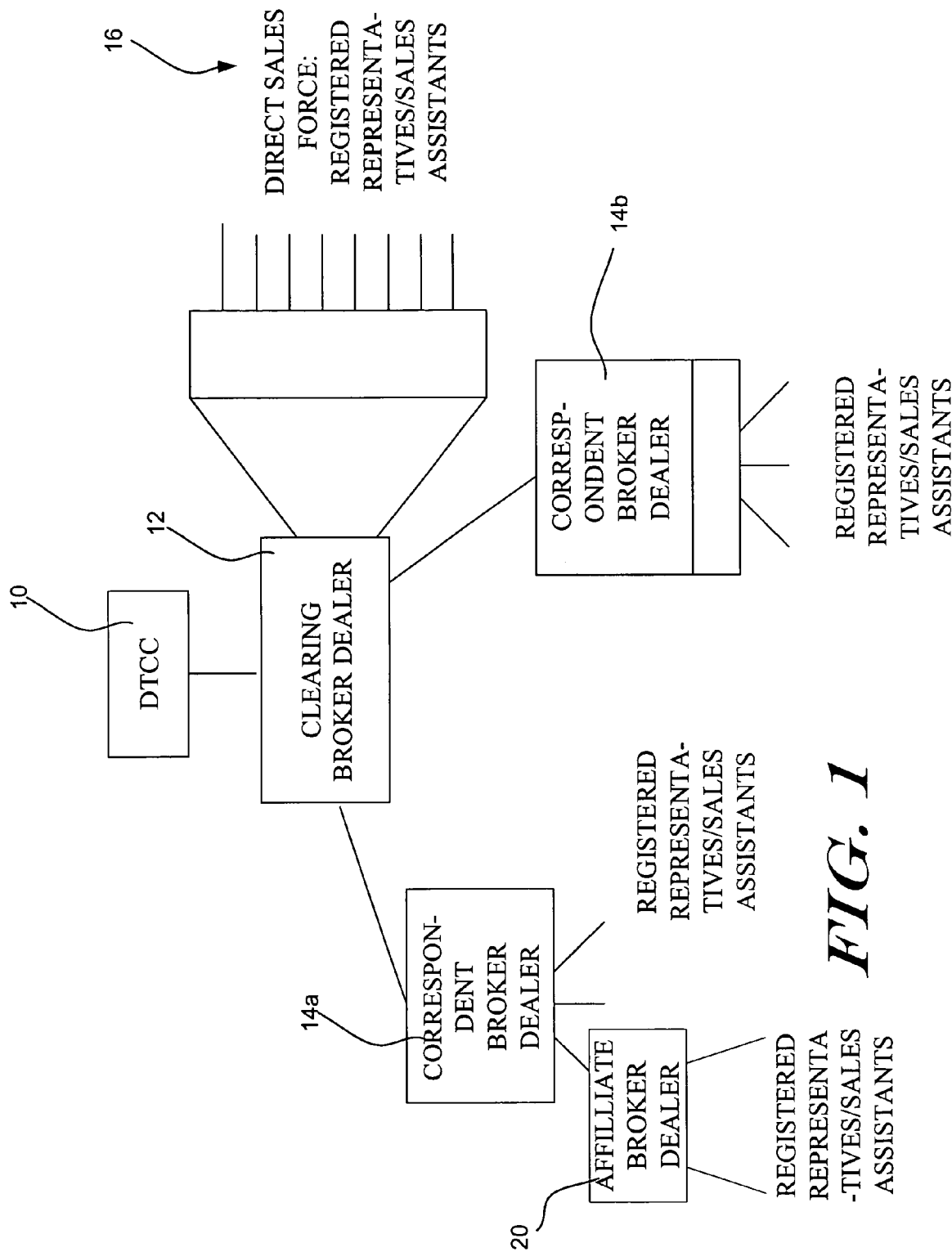
FIG. 1 is a schematic diagram showing the product distribution model commonly used in the financial services industry.

FIG. 1 is a schematic diagram showing the distribution model commonly used in the financial services industry to move investment products. The distribution model often begins with the DTCC (Depository Trust Clearing Corporation—formerly NSCC) 10. The DTCC clears a majority of the investment market's equity, debt and mutual find trades, and also some industry insurance transactions. Financial services who transact business through the DTCC 10, must either be a Clearing Broker Dealer 12 or a correspondent 14 to a Clearing Broker Dealer. Clearing Broker Dealers 12 generally have systems that facilitate trading with the DTCC 10.

The Clearing Broker Dealers 12 may have their own direct sales force, which often includes registered representatives and sales assistants 16 that sell investment product directly to customers. The Clearing Broker Dealers 12 may also have a number of Correspondent Broker Dealers 14a and 14b. Each Correspondent Broker Dealer 14a and 14b may have a number of registered representatives and sales assistants to sell investment product to their customers. Some of the Correspondent Broker Dealers 14 may have Affiliate Broker Dealers, such as Affiliate Broker Dealer 20, which may also have registered representatives and sales assistants for selling investment product to their customers.

Figure 2:
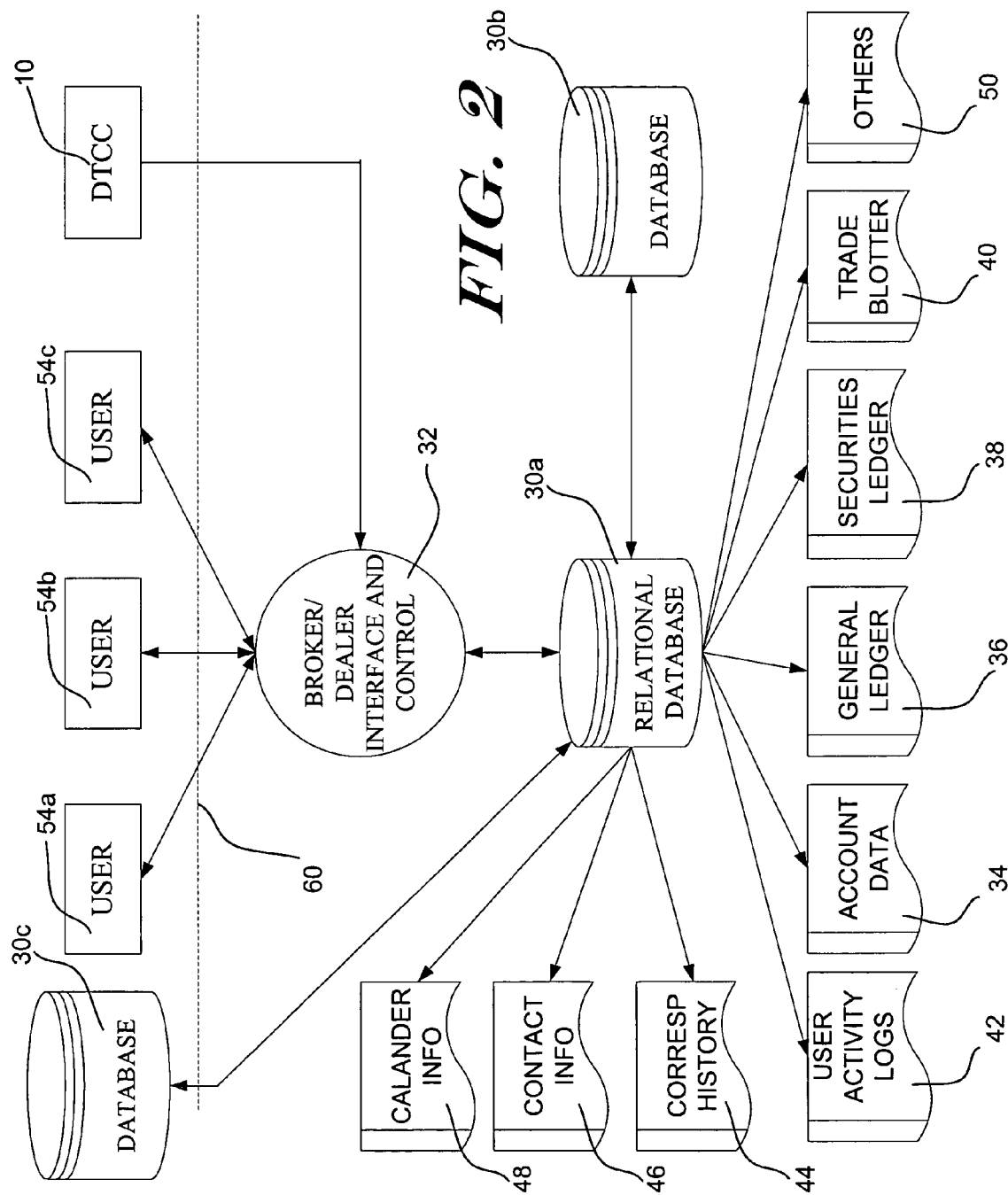
FIG. 2 is a schematic diagram showing the architecture of an illustrative system for assisting financial services firms and their representatives in efficiently managing their businesses.

FIG. 2 is a schematic diagram showing the architecture of an illustrative system for assisting financial services firms and their representatives in efficiently managing their businesses and developing and maintaining strong customer service and loyalty. The illustrative system may be used by financial services firms such as Clearing Broker Dealers 12, Correspondent Broker Dealers 14a and 14b, Affiliate Broker Dealers 20 (see FIG. 1), or other financial services firms such as banks, insurance companies, consumer finance organizations, wire houses, etc.

The illustrative system uses a database 30a, which is preferably a relational database such as a Microsoft Access®, Microsoft SQL Server 2000®, Oracle 9i®, etc. In some embodiments, the system may also access other databases, such as databases 30b and 30c. Database 30b is shown as another local database, and database 30c is shown as a remote database. Multiple local and/or remote databases may be used by the system, if desired.

The broker/dealer interface and control block 32 provides an interface between the databases 30a-c and the users 54A, 54B, and 54C of the system. The users 54A, 54B, and 54C may be any type of users, but in the illustrative embodiment, are registered representatives and/or sales assistants. In a preferred embodiment, the broker/dealer interfacing control block 32 and relational database 30a (and 30b-c if desired) operate on one or more servers connected to a number of client systems through the World Wide Web (WWW). The users 54A, 54B and 54C preferably access the broker/dealer interface and control block 32 using the client systems. The server functions are generally shown below dashed line 60, and the client functions are generally shown above dashed line 60. While the preferred embodiment allows the users 54A, 54B and 54C to access the broker/dealer interface and control block 32 via the WWW, other embodiments allow the users 54A, 54B and 54C to access the broker/dealer interface control block 32 in any number of ways including, for example, through an intranet, a LAN, a direct connection, or any other connection mechanism or means.

To receive pricing data and to clear trades, the broker/dealer interface and control block 32 may be connected to the DTCC 10 and/or other services. It is contemplated that these connections may be via the WWW, an intranet, a LAN, a direct connection, or any other connection means.

In the illustrative embodiment, the relational database 30a includes a number of data files (or entries) to support the activities of users 54A, 54B and 54C. In some embodiments, some of these data files and/or additional data files are provided in databases 30b and 30c. Some illustrative data files include customer account data 34, general ledger data 36, securities ledger data 38, trade blotter data 40, user activity logs 42, customer correspondence history logs 44, customer contact information 46, calendaring information 48, and others 50. The account data file 34 preferably identifies each customer account, and the contents of each account. A customer account may include, for example, a customer account number, current and past holdings of the account, investment objectives of the account, personal information about the customer including the customer's name, address, interests, etc.

The general ledger data file 36 preferably stores a general ledger for the broker dealer firm. The securities ledger 38 preferably records each buy and sell executed by the broker dealer firm. The trade blotter data file 40 preferably stores each trade executed by the broker dealer firm. The user activity log data file 42 preferably stores information relating to each user's activity on the system. The correspondence history data file 44 preferably records the correspondence history between each representative and their customers. The contact information data file 46 preferably stores contact information for each customer including, for example, customer name, address, phone number, fax number, e-mail address, etc. The calendaring information data file preferably records appointments as well as other items provided by the representatives.

Figure 3:
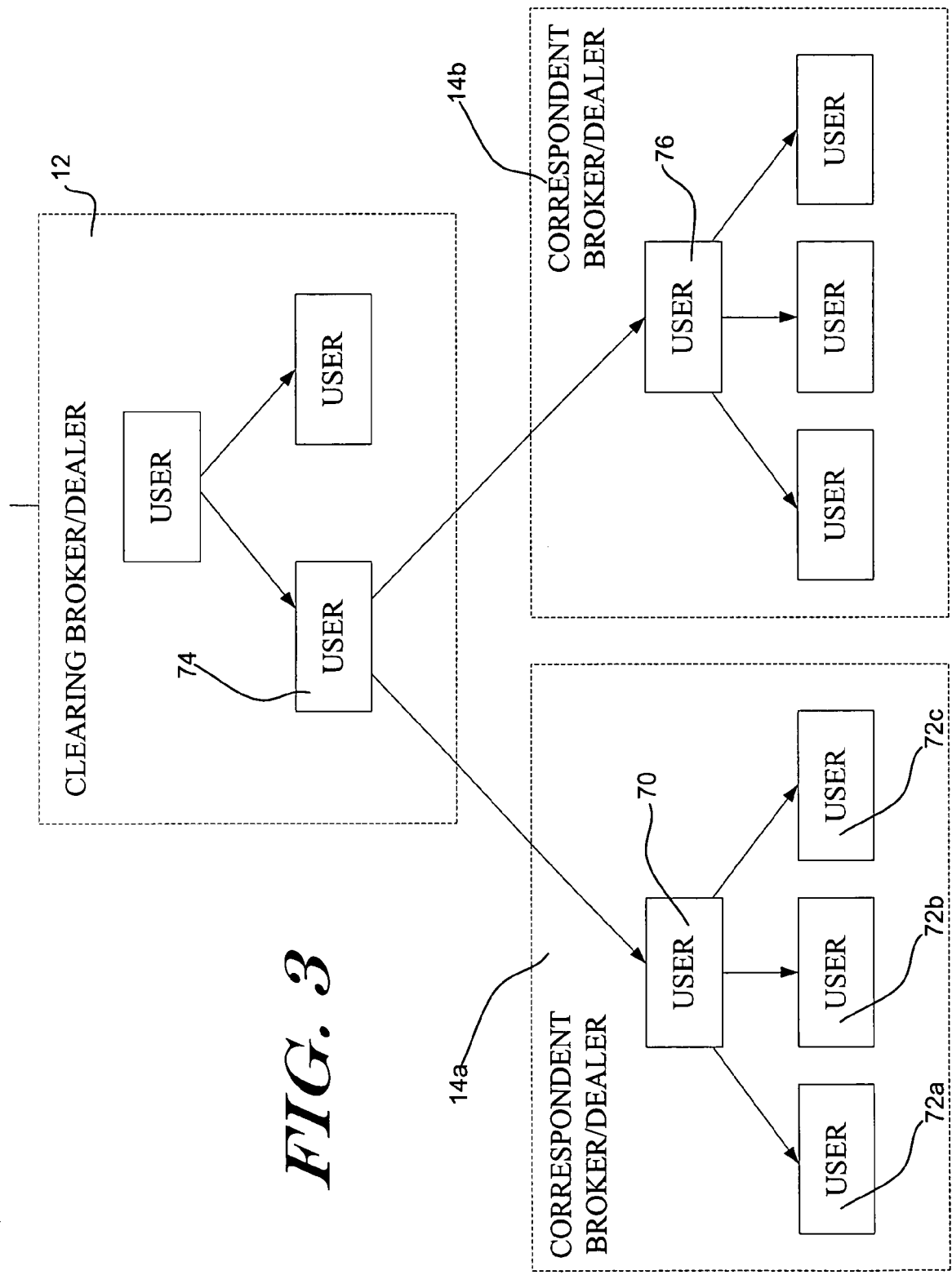
FIG. 3 is a schematic diagram showing an illustrative user hierarchy in accordance with the present invention.

FIG. 3 is a schematic diagram showing an illustrative user hierarchy in accordance with the present invention. In the illustrative embodiment, the Clearing Broker Dealer 12 has a first Correspondent Broker Dealers 14a and a second Correspondent Broker Dealers 14b. Both the Clearing Broker Dealers 12 and the Correspondent Broker Dealers 14a and 14b preferably use the system, and share database 30a of FIG. 2. When so provided, the various users of the system can be placed in a hierarchical tree. Those placed higher in the hierarchical tree may be given access to the accounts and data of the users placed lower in the hierarchical tree structure. For example, user 70 of the first Correspondent Broker Dealers 14a may have access to the accounts and data of users 72a, 72b and 72c. User 70 may be, for example, the representative that heads the first Correspondent Broker Dealers 14a. Likewise, user 74 of the Clearing Broker Dealer 12 may have access to the accounts and data of users 70, 72a, 72b and 72c of first Correspondent Broker Dealers 14a, and the users of the second Correspondent Broker Dealers 14b including user 76. User 74 may be, for example, a compliance officer with the Clearing Broker Dealers 12. This user hierarchy is preferably achieved by providing an identifier for each user that identifies those users that are lower (or higher) in the hierarchical tree structure.

As is known, the financial services industry as well as other industries are subject to a vast array of rules and regulations from a variety of regulatory agencies. Because of these rules and regulations, each broker dealer has an obligation to ensure that all of its representatives follow all applicable rules and regulations. To accommodate this, and to help limit any potential liability for non-compliance, the hierarchical tree structure discussed above may be used to monitor the activities of representatives in the firm. In one embodiment, those higher in the hierarchical tree structure are given the rights to monitor the activities of those lower in the hierarchical tree structure. Preferably, the hierarchical tree structure corresponds to the responsibility assumed by each broker dealer in complying with the rules and regulations required by the various regulatory agencies. Various methods and systems for providing a measure of supervision over the activities of the representatives of a firm are described in co-pending U.S. patent application Ser. No. 09/917,447, entitled "Methods And Systems For Providing A Measure Of Supervision Over The Activities Of Representatives Of A Business".

Figure 4:
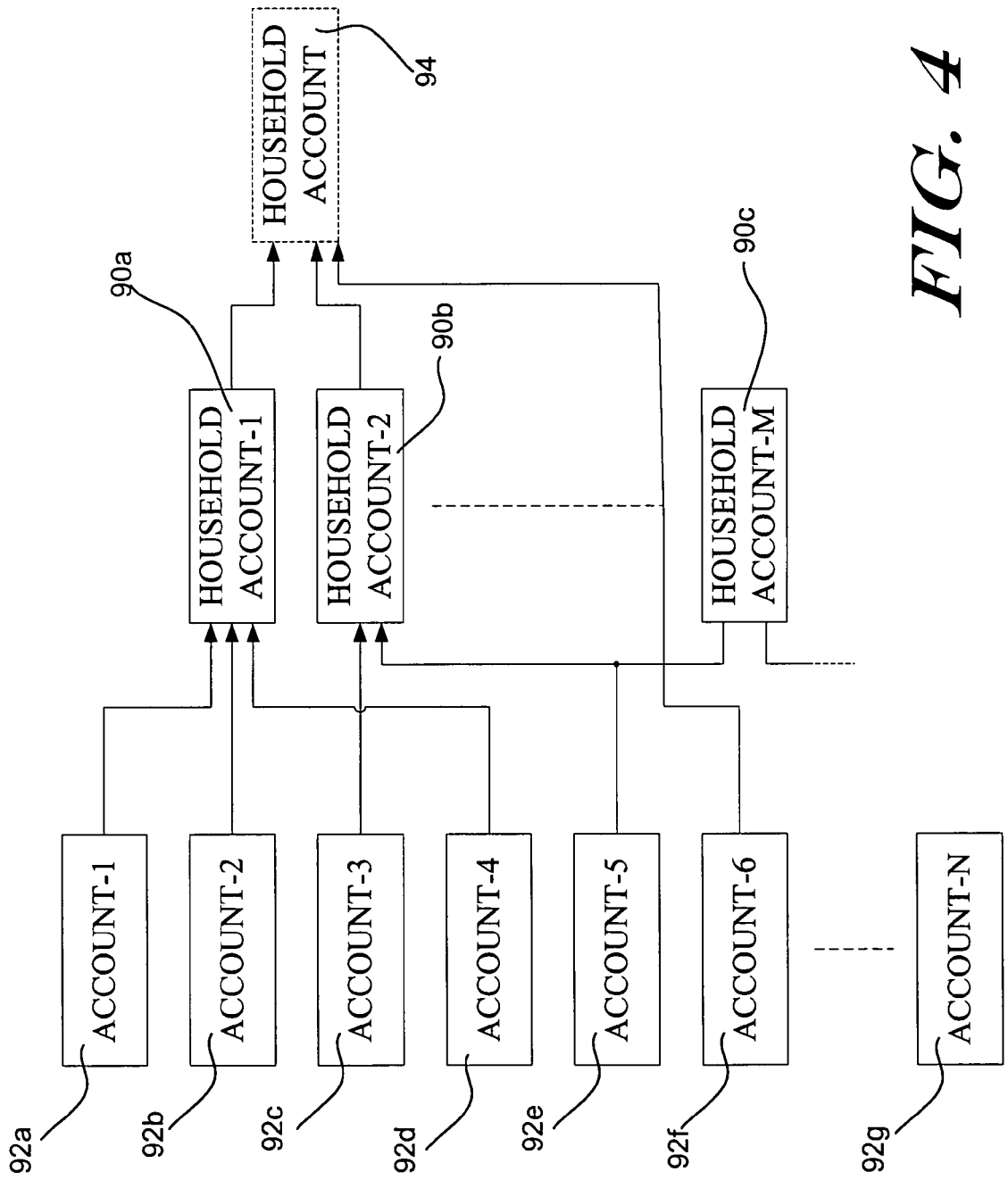
FIG. 4 is a schematic diagram showing an illustrative account hierarchy in accordance with the present invention.

FIG. 4 is a schematic diagram showing an illustrative account hierarchy in accordance with an illustrative embodiment of the present invention. When a representative is analyzing or discussing a customer's portfolio, it is highly desirable for the representative to have ready access to information regarding all of the customer's accounts. It is also highly desirable to be able to combine certain accounts "on the fly", such as several business accounts or all family accounts including 401K accounts. This may allow the representative to provide an overall or macro view of the customer's portfolio. To accomplish this, and in accordance with one illustrative embodiment of the present invention, the representative is allowed to create a data structure that has one or more associated links. The data structure, when created, can be thought of as a "household" account, although it does not have to be associated with a customer's "household", nor does it preferably contain any actual account data. Instead, the "household" account can be arbitrarily defined, and may only includes a number of links that identify or point to other accounts within the system.

Several such household accounts are shown at 90a, 90b, and 90c. Household account 90a includes links to accounts 92a, 92b and 92c. Likewise, household account 90b includes links to accounts 92c and 92e. As indicated above, the links are preferably defined by the representative. Once defined and selected, the present invention may display the account items that are within the accounts identified by the one or more links of the selected household account data structure. The household accounts may be saved for later reference and use.

It is contemplated that the "household" accounts may link, point to, or pull in data from other databases, such as databases 30b and 30c (see FIG. 2). For example, database 30c may include account or other information from a remote brokerage house, bank or the like. In this example, the "household" account may link, point to, or pull in account information from database 30c. This illustrates that the "household" accounts may include references to both local and remote databases, if desired.

To provide a degree of hierarchy, a household account may include a link to one or more other household accounts. Such a data structure is shown at 94, and may be referred to as a household-of-households account. When a household-of-households account is selected, the present invention preferably displays the account items within the accounts directly identified by the one or more links of the household-of-households account, as well as the account items within the one or more accounts identified by the links in the identified sub-household account or accounts. For example, when household-of-households account 94 is selected, the present invention preferably displays the account items within accounts 92a, 92b, 92c which are identified by the links of household account 90a, account items within accounts 92c and 92e which are identified by the links of household account 90b, as well as account 92f which is directly identified by a link of household-of-household account 94.

Multiple levels of household-of-household accounts may be created, providing maximum flexibility to the representative. An advantage of using a data structure that only includes links rather than actual account data is that the displayed account items are collected from the actual accounts at the time of display, and are therefore up-to-date. For this reason, the household (and household-of-household) accounts may be referred to as dynamic link accounts.

To simplify the display of account items, related account items from the various accounts identified by a household account may be combined before the data items are displayed. An example account item that may be combined is a stock position in a particular company. To do this, the account items that are related are first identified. Then, the related account items are combined by, for example, summing the stock positions for the particular company, and outputting a single collective account item for display. In this example, an average or effective purchase price for the stock may be computed and also displayed. By combining related account items, the number of account items that are displayed may be reduced. In addition, the representative may more clearly see the particular emphasis of the customer's portfolio. Various reports may also be run on the individual accounts or household (or household-of-household) accounts, as desired.

Figure 5:
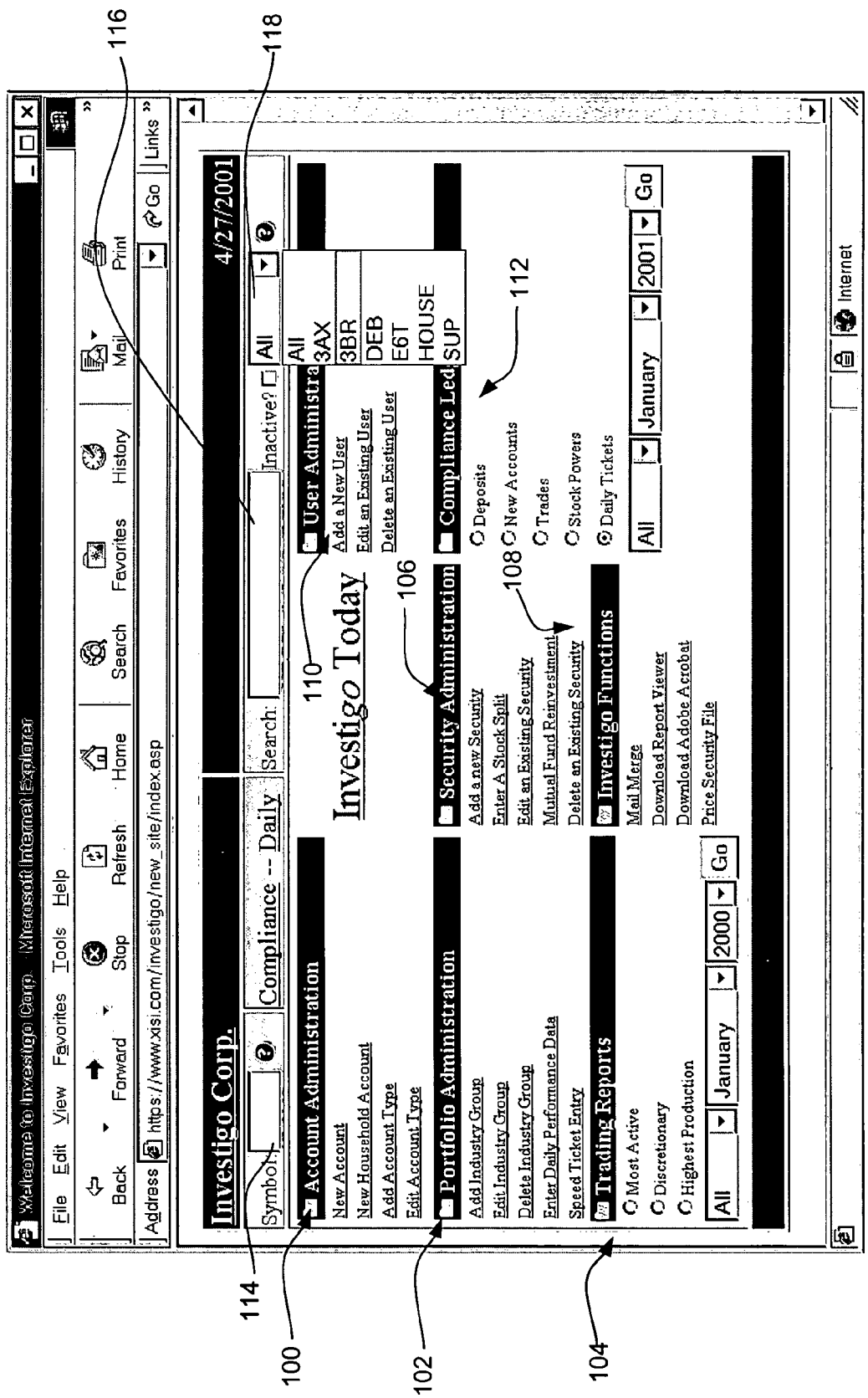
FIG. 5 is a screen shot of an illustrative initial window that may be displayed in accordance with the present invention.

FIG. 5 is a screen shot of an illustrative initial window that may be displayed in accordance with the present invention. The initial window includes an account administration section 100, a portfolio administration section 102, a trading report section 104, a security administration section 106, an Investigo functions section 108, and a compliance ledger section 112. The account administration section 100 allows a representative to create a new account, including a new household account, add an account type or edit an account type. The account administration section 100 is used by the representative to manage his or her customer accounts within the system.

The portfolio administration section 102 allows a representative to add an industry group, edit an industry group, delete an industry group, enter daily performance data, or enter a speed ticket entry. The trading reports section 104 allows the representative to generate trade reports for selected representatives and for selected periods of time, as further described below. The security administration section 106 allows a representative to add a new security, enter a stock-split, edit an existing security, manage mutual fund reinvestment, or delete an existing security. The Investigo functions section 108 provides a number of functions for the representative user. These functions include a merge function, a download report viewer function, a download Adobe Acrobat Reader® function, and a price security file function. The merge function is discussed further below.

The user administration section 110 allows a representative to add a new user, edit an existing user, or delete an existing user. Typically, only higher level users have the rights to perform these functions. The compliance ledger section 112 allows a representative to generate a number of reports, each covering a specified period of time. In this illustrative embodiment, these reports include a deposits report, a new accounts report, a trade report, a stock powers report, and a daily tickets report. The deposits report displays all deposits made by customers to the broker dealer firm during a specified period of time. The new accounts report displays all new accounts that were created during the specified period of time. The trades report identifies all trades made by the broker dealer firm during the specified period of time. The stock powers report identifies all stock power that were created during the specified period of time. Finally, the daily tickets report identifies all daily tickets generated by the broker dealer firm during the specified period of time. Some or all of these reports can be limited to only display activities that are related to a particular representative or group of representatives. These reports are useful in monitoring the activities of the firm, and can provide valuable documentation in the event of a compliance audit.

Figure 13:
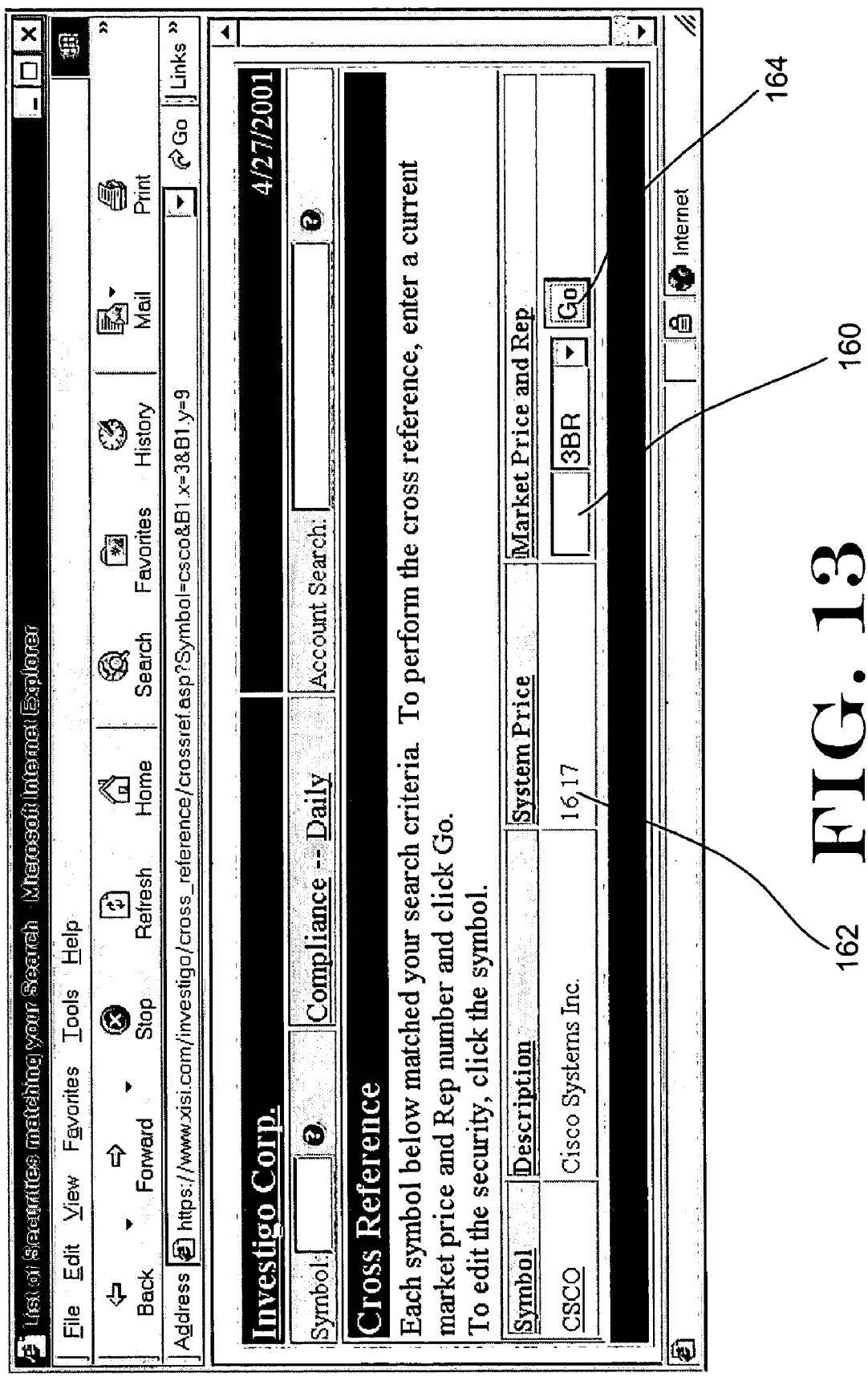
FIG. 13 is a screen shot showing an illustrative window that may be displayed when the phrase "CSCO" is entered into the Symbol dialog box of FIG. 5.

The illustrative initial window of FIG. 5 also includes a symbol dialog box 114. When a representative enters a symbol for a particular equity or fund into the symbol dialog box 114, and hits return, information about that particular equity is displayed as shown in FIG. 13. The illustrative initial window also includes a search dialog box 116. The search dialog box 116 allows the representative to enter a string. In the illustrative embodiment, the system compares the string against the account data within the database 30a (see FIG. 2). All accounts having a customer name that at least partially matches the string is displayed in another window, as shown and further described below with respect to FIG. 16. Finally, the illustrative initial window of FIG. 5 has a representative selection window 118 for selecting a particular representative or user of the system. By selecting a particular representative, the data displayed by the various functions described above only includes data associated with the selected representative and his or her customers.

FIG. 6 is a screen shot of an illustrative window that may be displayed when the "Most active" button (for all Reps) is selected in the Trading Reports Section 104 of FIG. 5. This window shows the ten most active accounts for all representatives using the system for the month ending Jan. 31, 2000. In the illustrative embodiment, "Most active" means the greatest number of trades. However, it is contemplated that "Most active" could mean the greatest number of shares or greatest value of shares traded or any other definition as desired. This window allows a broker dealer to identify the most active customers of the firm, which often translates into the most derived commissions. A savvy firm may provide preferential treatment to these customers.

FIG. 7 is a screen shot of an illustrative window that may be displayed when the "Most active" button (for Rep 3BR) is selected in the Trading Reports Section 104 of FIG. 5. This window shows the ten most active accounts for representative "3BR" for the month ending Jan. 31, 2000. This window allows a representative to identify his or her most active customers, which as indicated above, often translates into the most derived commissions.

FIG. 8 is a screen shot of an illustrative window that may be displayed when the "Deposits" button under the Compliance Ledgers section of FIG. 5 is selected. This window shows the check deposit ledger for all representatives for the month ending Oct. 31, 2000. The illustrative check deposit ledger shows a date that each check was received, the account number where each check was deposited, the account name where each check was deposited, the amount of each check, the date of deposit, the payee of each check, and the representative. Such a check ledger is a mandatory requirement by, for example the NASD, and may be useful in the event of a compliance audit.

FIG. 9 is a screen shot of an illustrative window that may be displayed when the "Trades" button under the Compliance Ledgers section of FIG. 5 is selected. This window shows an illustrative trade buy blotter for all representatives of the broker dealer firm for dates extending between Oct. 1, 2000 to Oct. 31, 2000. The illustrative trade buy blotter shows the trade date, the settle date, whether the trade was a buy or sell, the account number corresponding to each trade, the particular product or security that was traded, the number of shares traded, whether the trade was solicited or unsolicited by the representative, the buy price per share, the total buy cost, and the buy commission. Each buy entry shown in FIG. 9 is generated by the system when a representative executes a buy trade using the pull down menu shown in FIG. 20.

FIG. 10 is an illustrative screen shot that is displayed when the "Daily Tickets" button under the Compliance Ledgers section of FIG. 5 is selected. This window shows illustrative daily trade tickets for all representative for the period extending between Oct. 1, 2000 and Oct. 31, 2000. The illustrative daily trade tickets report shows the trade date, the settle date, whether the trade was a buy or sell, the account number corresponding to each trade, the particular product or investment traded, the number of shares traded, whether the trade was solicited or unsolicited by the representative, the type of trade, the desired price, the report price, and the representatives for each trade.

FIG. 11 is a screen shot of an illustrative window that may be displayed when the "Mail Merge" hyperlink under the Investigo Functions section of FIG. 5 is selected. The "Mail Merge" function can be used to improve the efficiency of a representative in identifying and contacting various customers. The illustrative "Mail Merge" function begins with a search or query function. The search or query function can be used to identifying customers that have desired characteristics.

As indicated above, the account data file 34 of FIG. 2 may include one or more accounts for each customer. Each account may have a number of fields including, for example, the customer's name, the customer's address, the customer's birthday, the customer's current holdings, the number of shares owned, the purchase price of each stock, the current price of each stock, the customer's net worth, hobbies and interests of the customer, etc. The representative may use the search or query function to identify those customers that have one or more fields that match a desired query value or expression. For example, the representative may wish to identify all customers that have a birthday in March. Alternatively, the representative may wish to identify all customers that hold a particular stock, have a net worth greater than $500,000 and are interested in Golf. By entering an appropriate value or expression into the system, such as through the appropriate menu shown in FIG. 11, the desired customers can be identified.

The illustrative window shown in FIG. 11 includes four basic sections. The first section, called the account registration section 150, allows a representative to select a particular representative, the account type desired, the report frequency, and the state of residence of the customer. The second section, called the investment objective section 152, allows a representative to select customers by various investment objectives. The next section, called a personal interest section 154, allows a representative to select customers that have a particular hobby or interest. Finally, the last section, called the holdings section 156, allows the representative to select customers by the type of holdings that they currently own.

Once the various menu options are selected, the create mail merge button 158 may be selected. In the illustrative embodiment, the create mail merge button 158 causes the system to assembly a query and search the database 30a to identify those customers that match the query. The system preferably provides an output that includes, for example, the identified customers' names and addresses. The output is preferably formatted as a merge document that can be read by an application program that has a merge capability (e.g. Microsoft Word®). The merge capability can be used to insert the outputted fields into another document such as a letter or a promotional item, which can then be easily sent to the identified customers. The formatted output can also be formatted for a spreadsheet program, or to print on printed labels or envelopes, as desired. Other formats are also contemplated including, for example, formats that are compatible with e-mail systems or personal digital assistants (PDAs). The mail merge function allows the representatives to provide increased customer service with little extra effort.

Figure 12:
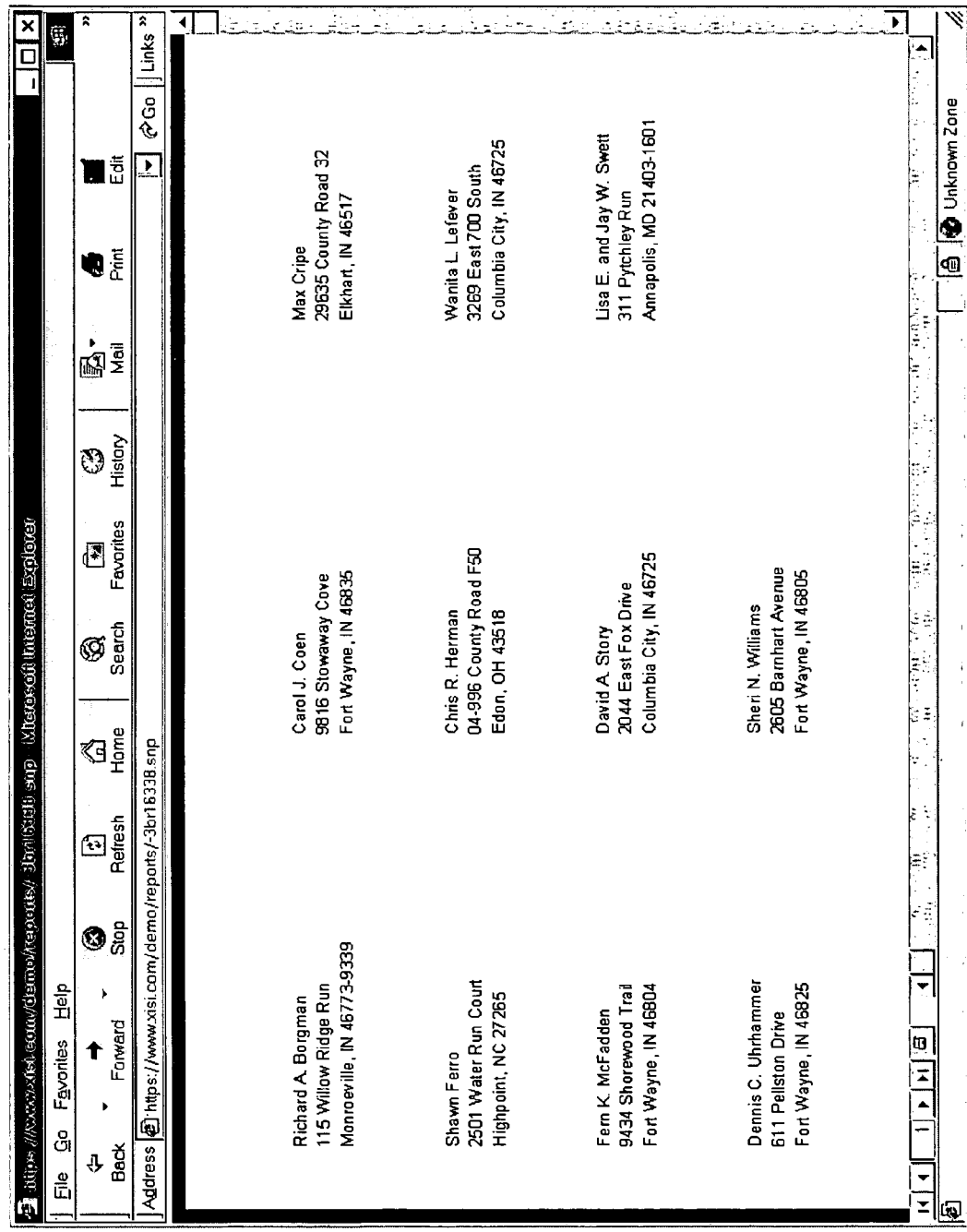
FIG. 12 is a screen shot showing an illustrative output when the "Create Mail Merge" button of FIG. 11 is selected.

FIG. 12 is a screen shot showing an illustrative output when the "Create Mail Merge" button 158 of FIG. 11 is selected. In the illustrative embodiment shown, the output is formatted to print on printed labels. The names and addresses of the customers identified by the query of FIG. 11 are formatted so that each name/address prints on a separate label of a conventional label sheet. It is contemplated that the page shown can be printed directly from within the browser program shown, and/or a file can be provided to the representative's local computer system, which can then be printed on a local printer.

FIG. 13 is a screen shot showing an illustrative window that is displayed when the term "CSCO" is entered into the Symbol dialog box of FIG. 5. When the string "CSCO" is entered, the system preferably searches through the database 30a and identifies all equity symbols that match. Only one symbol matches the string "CSCO" in the illustrative embodiment, which corresponds to Cisco Systems Inc. The symbol, the description of the symbol, the system price, the market price and the representative are all shown in the illustrative window. The system price, shown at 162, may be a real time price or an end of day price, as desired. If a real time price is desired, a real time stock price feed must be provided to the system. Rather than accepting the system price 162, the representative may provide another price, such as a current market price, into the dialog box 160. This price will override the system price 162 when the go button 164 is selected.

FIG. 14 is a screen shot showing an illustrative window that may be displayed when the "Go" button 164 of FIG. 13 is selected. This window shows all accounts for the representative 3BR that have open positions for CSCO. The illustrative window shows an account number, the last name of the customer corresponding to each account, the symbol (in this case CSCO), the number of shares owned, the open date, the average price of the shares, a total cost for the shares, a profit/loss based on the system price 162 of $16.17, and contact phone numbers.

To go to a specific account, the representative merely clicks on the account number, which is a hyperlink to the corresponding account within the database 30*a*. To sell a specific position, the representative need only click on the number of shares, which is a hyperlink to that specific entry within the corresponding account. This window may be useful in identifying customers that may wish to sell their open position in Cisco Systems Inc. A merge function 180 may be used to generate printed labels or a merge file that can be used to easily contact the identified customers.

Figure 15:
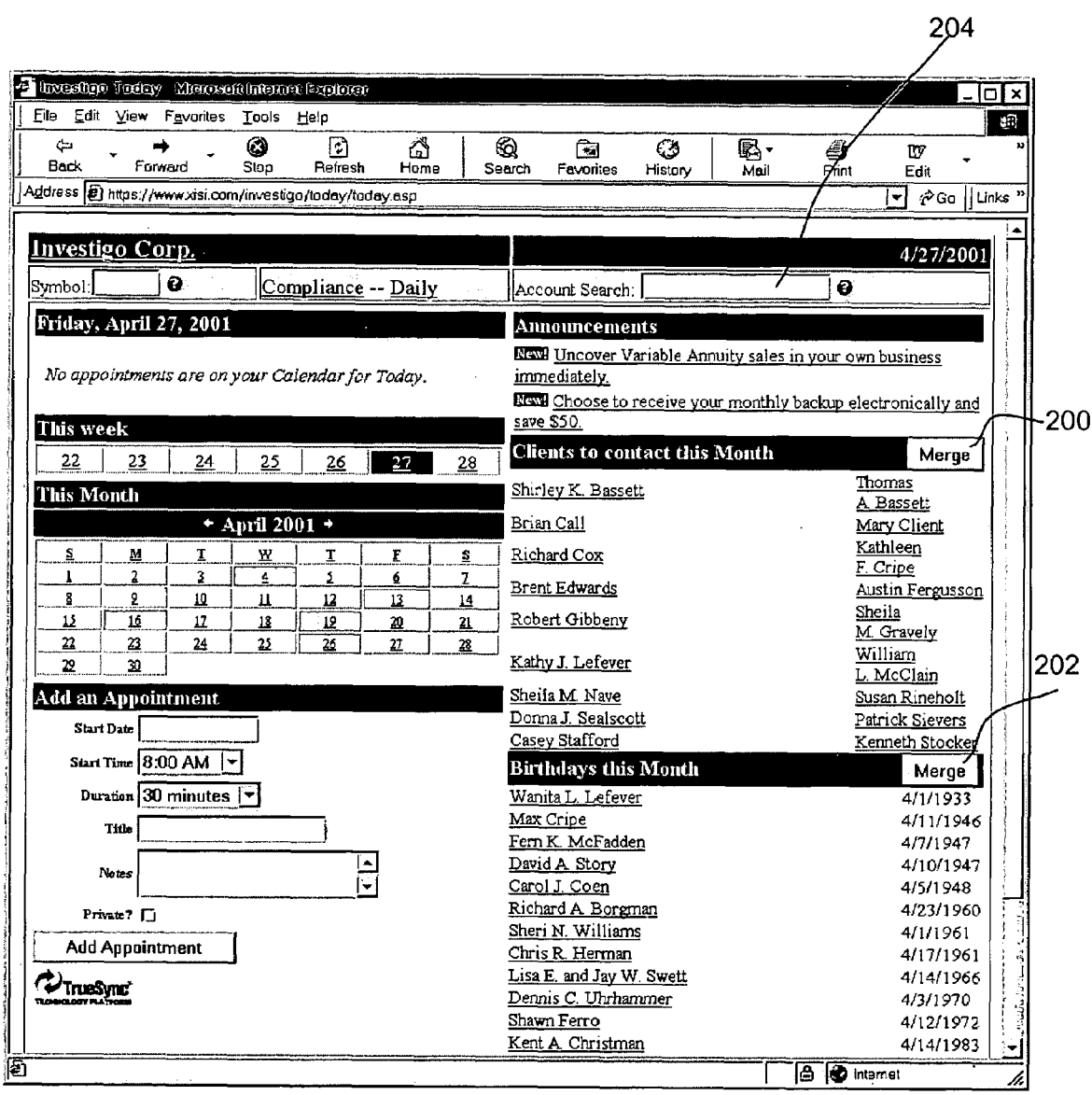
FIG. 15 is a screen shot showing an illustrative window that may be displayed when the "Investigo Today" hyperlink on FIG. 5 is selected.

FIG. 15 is a screen shot showing an illustrative window that may be displayed when the "Investigo Today" hyperlink on FIG. 5 is selected. This window provides each representative with a calendaring function that allows the representative to schedule appointments and generally keep track of current and future activities. The window also displays a listing of all of the customers of the representative that should be contacted in the current month. Some customers may wish to be contacted every month or every quarter, and the system may track when each customer should be contacted next. Also, the system preferably only show those customers yet to be contacted. That is, once a customer is contacted, the representative preferably records the contact using the contact history function shown and described below with respect to FIG. 17. The system may note the contact history entry, and remove the customer from the list of customers to be contacted. A merge function 200 may be coupled to this function so that the representative can easily contact each of the listed customers.

The window shown in FIG. 15 may also display those customers that have a birthday in the current month. Both the name and birthday are displayed on the screen. A merge function 202 may be provided for easily contacting each of the customers that have a birthday in the current month.

Figure 16:
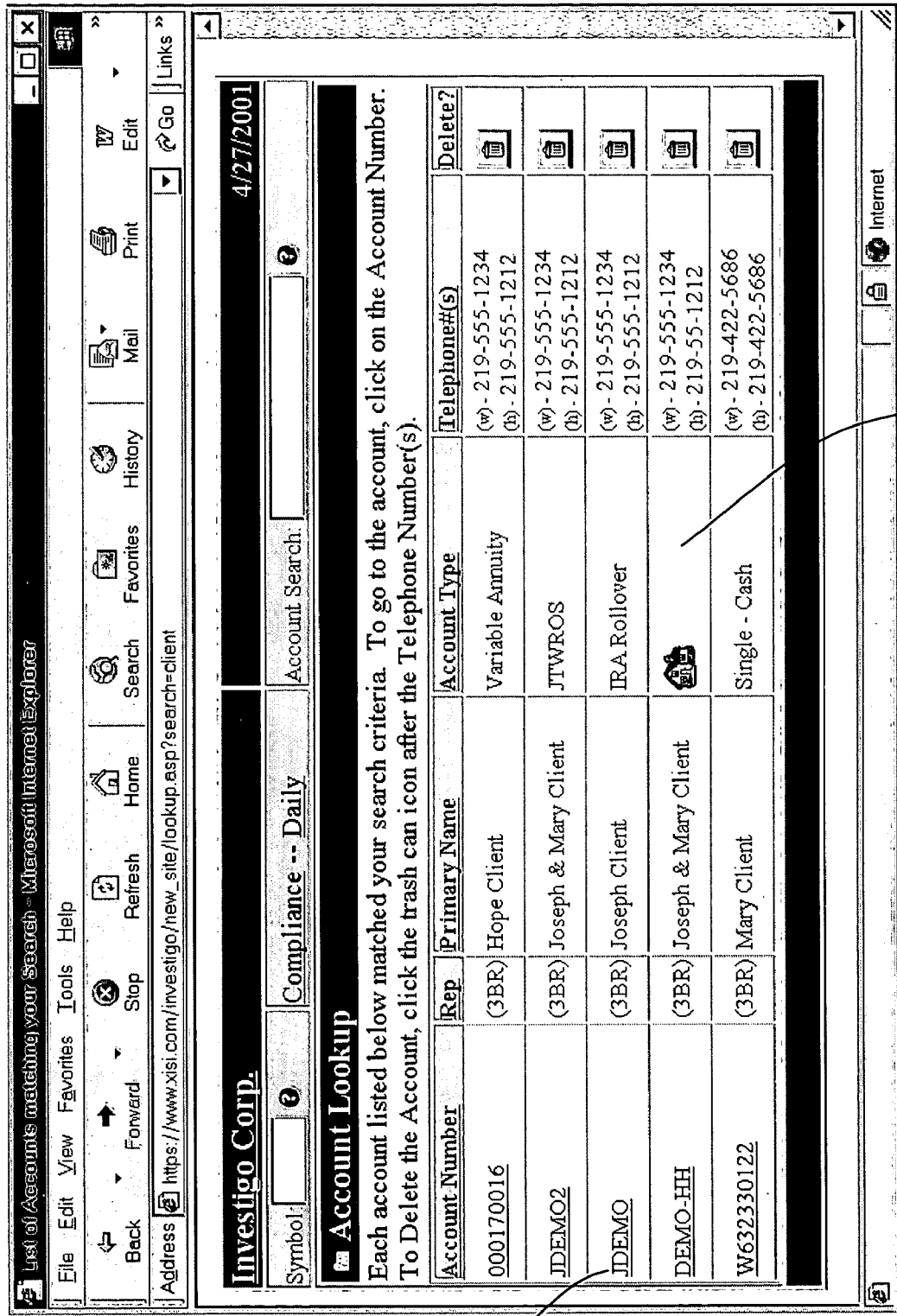
FIG. 16 is a screen shot showing an illustrative window that may be displayed when the phrase "customer" is entered into the account search dialog box of FIG. 15.

FIG. 16 is a screen shot showing an illustrative window that may be displayed when the string "client" is entered into the account search dialog box 204 of FIG. 15. The system searches the primary name field of each account, and identifies those accounts that match at least in part the string "client". In the illustrative embodiment, only those accounts that correspond to the representative 3BR are searched, and five accounts are identified. For each account, the account number, the representative, the primary name of the customer, the account type, and the telephone numbers are displayed. Household and household-of-household accounts are designated by the house icon 210. The account search dialog box 204 of FIG. 15 can thus be used by a representative to quickly find and access accounts within the system.

To access a particular account, the representative simply clicks on the account. FIG. 17 is a screen shot showing an illustrative window that may be displayed when the account number "JDEMO" 212 of FIG. 16 is selected. This window provides an overview for the selected account. The window identifies the particular account at 220, the customer's name and the type of account at 222, the customer's address, phone number and email address at 224, the holdings in the account at 226, the customer's investment objectives at 228, certain personal information regarding the customer at 230, and recent contact history between the representative and the customer at 232. The window shown in FIG. 17 also includes an administrative section 234 and an action section 236, which are further described below.

The holding section 226 identifies the quantity, symbol, date opened, unit price, net cost, market price, market value, and gain/loss for each holding in the account. Also displayed is the total equity for the selected account. The investment objectives section 228 is set by the representative, preferably after having discussions with the customer. The investment objectives of the customer are important to keep in mind. In fact, according to current NASD regulations, the investment objectives of each customers must be maintained, as decisions about future investments and investment strategies are evaluated in view of the customers investment objectives. As can be seen, the investment objectives of each customers are readily available and viewable by the representative when the customer's account information is displayed.

The personal information shown at 230 provides the representative with a high level snapshot of the customer and the customer's portfolio. The contact history section 232 is used to record the various contacts or discussions between the representative and the customer. This can be important, particularly during a regulatory audit of the firm. The full contact history between the representative and the customer can be displayed by simply selecting the "View JDEMO's contact history" hyperlink. A new entry in the contact history can be created by simply clicking on the Go button 250.

The administrative section 234 allows the representative to edit account information such as when the customer's address changes or when the customer's investment objectives change. The administrative section 234 also allows the representative to edit an open transaction or to perform a number of tasks that are commonly encountered when dealing with customers, such as making a cash deposit, as further described below with respect to FIG. 23. The action section 236 allows the representative to quickly generate various tables or graphs for the benefit of the customer, as further described below with respect to FIG. 18. The action section 236 also allows the representative to perform trades for the displayed account.

When a representative receives a call from a customer or wants to review a customer's account, the illustrative window of FIG. 17 may provide ready access to the customer's investment objectives, recent customer contacts, and other information such as the customer's current holdings. The present invention contemplates displaying, on a single screen or window such as shown in FIG. 17, the investment objectives and previously recorded customer contacts. Alternatively, the investment objectives and previously recorded customer contacts may be displayed in multiple windows that are displayed simultaneously, such as through multiple browser windows. The present invention also contemplates displaying on the same screen or window, or multiple screens or windows simultaneously, selected account holdings, and a number of personal information fields. A report generator option interface, a securities trade option interface, and/or a deposit option interface may also be displayed on the same screen or window, as shown. In aggregate, these represent the primary information sources that a representative needs to efficiently service his or her customers and create significant customer satisfaction and loyalty.

FIG. 18 is a screen shot showing the illustrative window of FIG. 17 with the report menu 260 in the action section 236 expanded. The report menu 260 displays a number of reports that can be generated for the selected account. In the example shown, an appraisal report, an appraisal graph, an asset allocation report, an asset allocation graph, a realized G/L report, and a performance report may all be generated using the report menu 260 in the action section 236. FIG. 19 is a screen shot of an illustrative window that may be displayed when the "Realized G/L" report is selected from the report menu 260 of FIG. 18. The "Realized G/L" report shows the realized gains and losses during the period from Jan. 1, 2000 to Apr. 26, 2001 for the selected account. The only position that was sold during this period was "AWSHX". The short-term and long-term profit and loss are calculated and displayed, as shown. This may be particularly useful when customers are preparing their tax returns.

Figure 20:
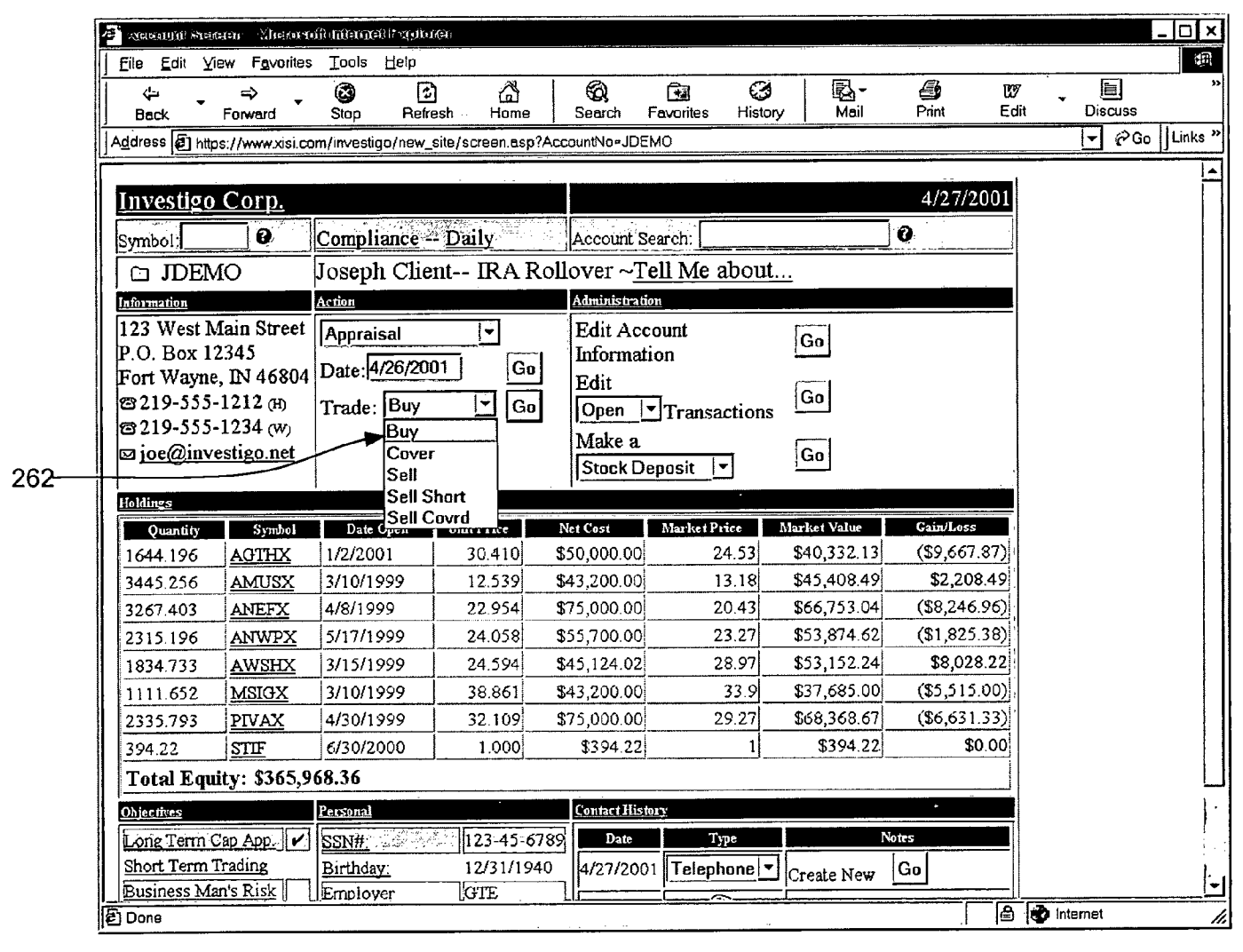
Figure 21:
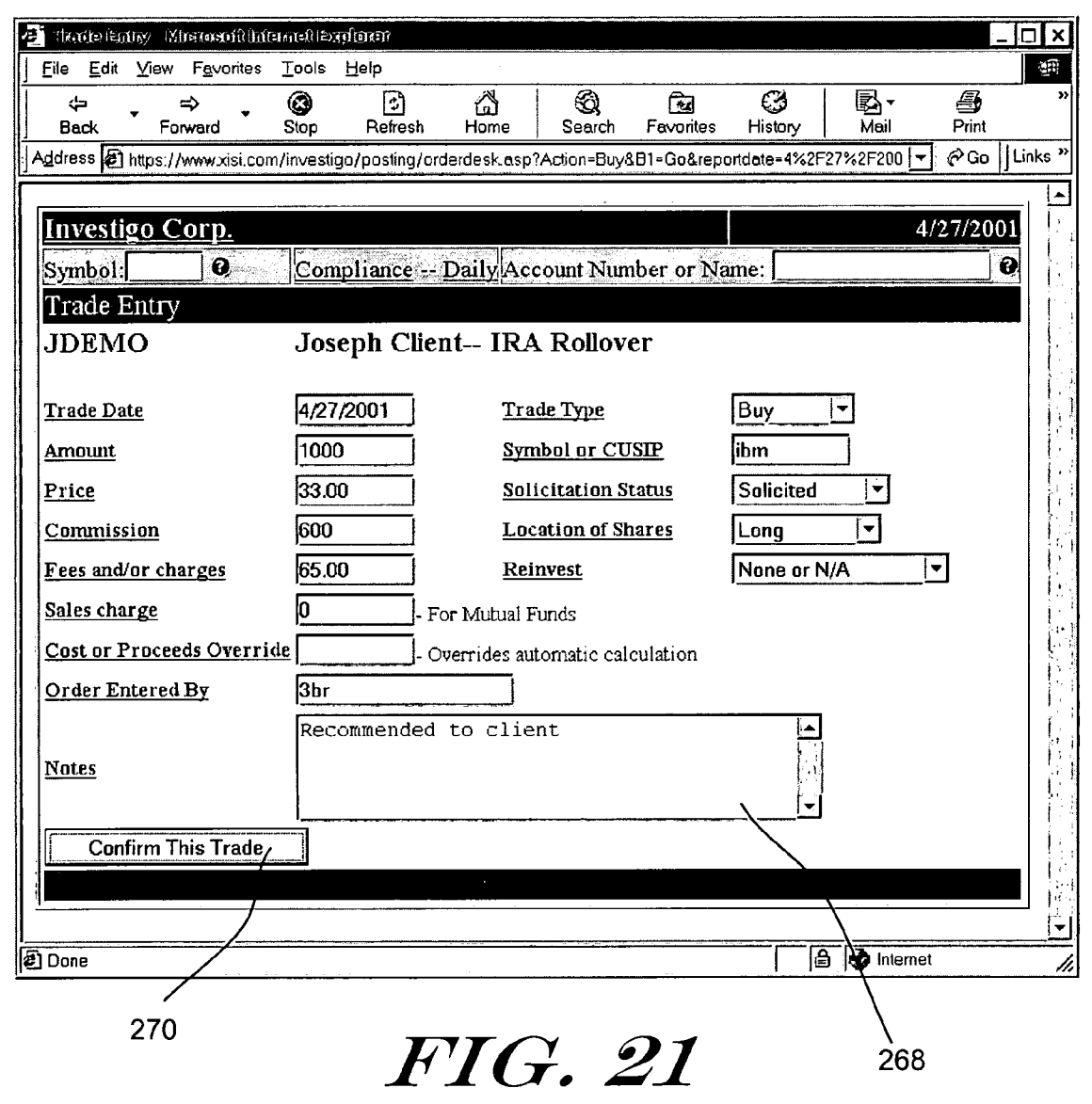

Referring back to FIG. 17, the action section 236 also includes a trade menu 262 for performing trades in the selected account. FIG. 20 is a screen shot showing the window of FIG. 17 with the trade menu 262 expanded. In the illustrative embodiment, the trade menu includes buy, cover, sell, sell short, and sell covered menu options. FIG. 21 is a screen shot of an illustrative window that may be displayed when "Buy" menu option is selected from the trade menu 262 of FIG. 20.

The window shown in FIG. 20 accepts a number of fields from the representative. In the example shown, the window accepts a trade type, a symbol or CUSIP, a solicitation status, the location of the shares, a trade date, an amount or number or of shares, a price, etc. A notes section 268 is also provided, which allows the representative to record any notes that are pertinent to the trade. Once the representative fills in the appropriate fields, the representative hits the confirm this trade button 270.

FIG. 22 is a screen shot of an illustrative window that may be displayed when the "Confirm This Trade" button 270 of FIG. 21 is selected. This window summarizes the information provided by the representative in FIG. 21. The representative reviews the displayed information and executes the order by selecting the "Execute this Buy Order" button 272. When the "Execute this Buy Order" button 272 is selected, the trade is executed and an entry is made in the trade buy blotter of FIG. 9.

Figure 23:
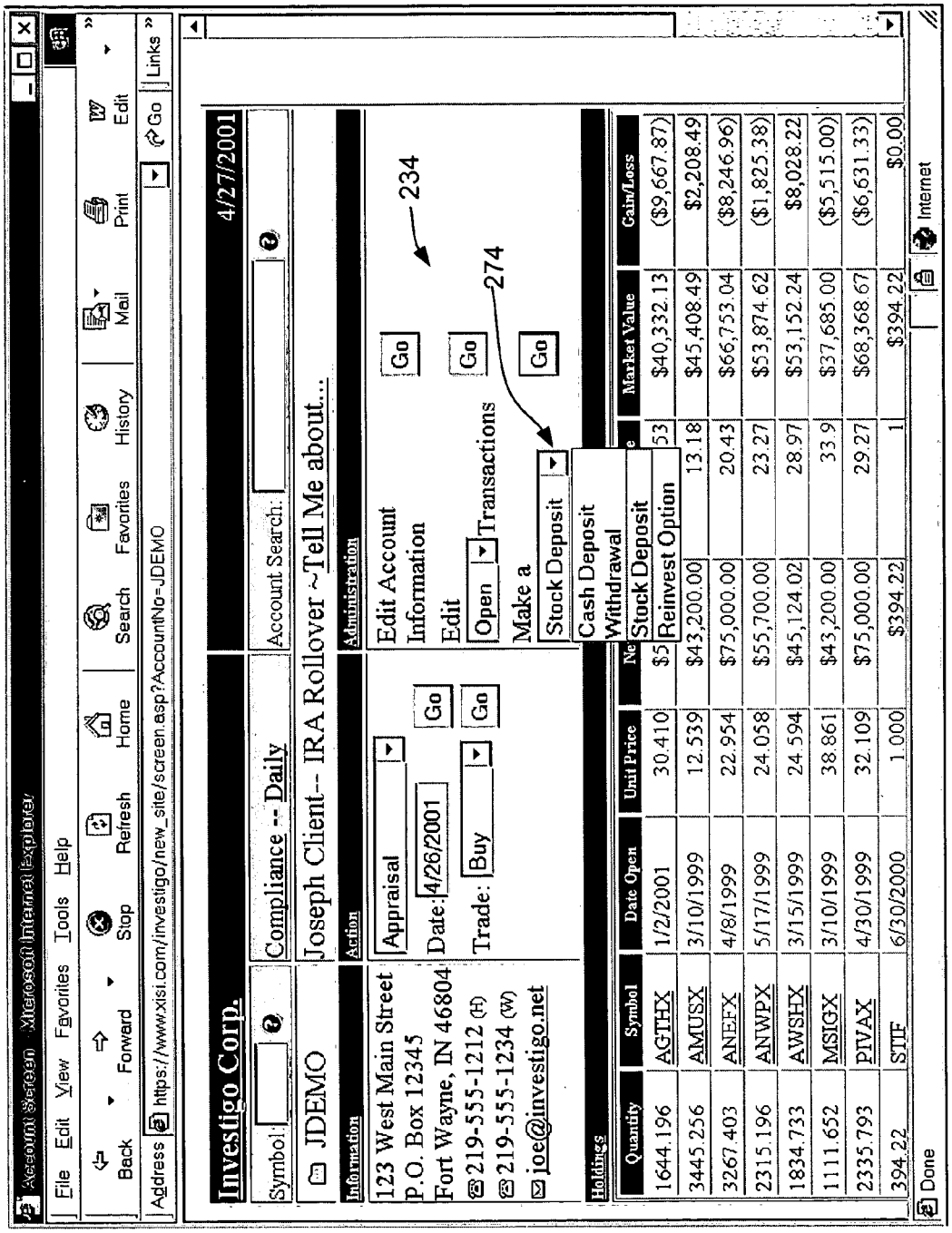
FIG. 23 is a screen shot showing the illustrative window of FIG. 17 with the "Make a" menu expanded.

Referring back to FIG. 17, the administration section 234 allows the representative to perform a number of operations that are commonly encountered when dealing with a customer. FIG. 23 is a screen shot showing the window of FIG. 17 with the "Make a" menu 274 expanded. The "Make a" menu 274 allows a representative to make, for example, a cash deposit, a withdrawal, a stock deposit, or a reinvestment of dividends.

Figure 24:
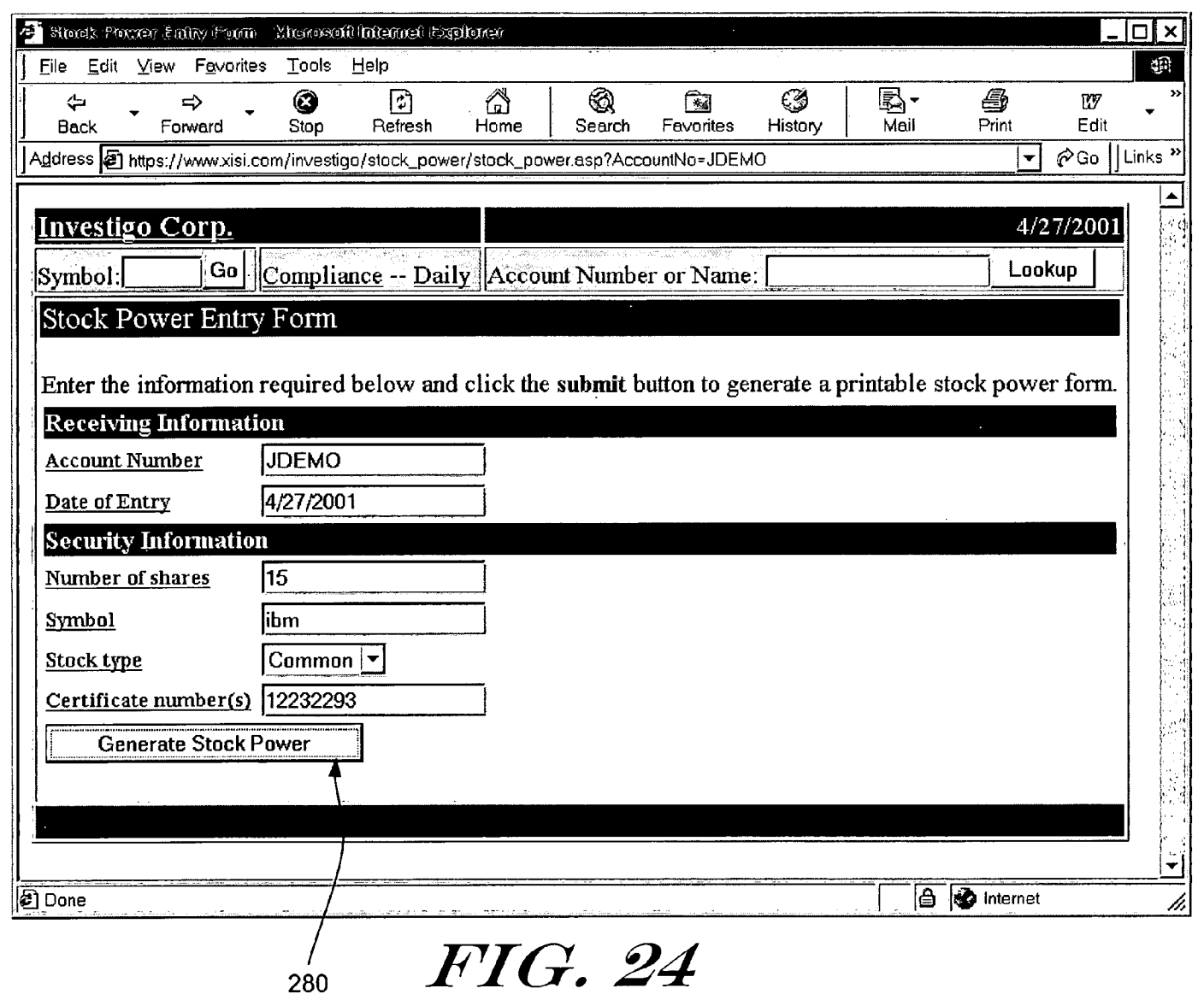

FIG. 24 is a screen shot of an illustrative window that may be displayed when the "Make a Stock Deposit" menu option of FIG. 23 is selected. This window shows the account number, the date of entry, the number of shares, the symbol, the stock type and the certificate number of the stock to be deposited with the broker dealer. Once these fields are entered by the representative, the representative may select the "generate stock power" button 280. The "generate stock power" button 280 generates a stock power for the stock deposit, as shown in FIG. 25.

In many small Broker Dealer firms, performing a stock deposit can be a time consuming and tedious task. During a typical stock deposit, the representative receives the stock from the customer, retrieves a copy of a stock power from paper files, completes the stock power, provides the customer with a receipt, and manually enters the received stock in the blotter of the firm. The present invention may substantially simplify this process. In the illustrative embodiment, the representative merely enters or creates a customer account in the system, enters a number of shares, a symbol, the stock type, and one or more stock certificate numbers as shown in FIG. 24. The system may then automatically generate a stock power that can be readily printed, as shown in FIG. 25. The system may also generate a receipt that can be readily printed, create an entry in the customers account, and enter the stock deposit in the firm blotter. This may significantly reduce the time required to process a stock deposit, and may reduce errors.

Referring back to FIG. 17, all open trades for a particular equity symbol for the active account can be displayed by selecting the equity symbol in FIG. 17. FIG. 26 is a screen shot of an illustrative window that may be displayed when the "ANEFX" equity symbol of FIG. 17 is selected. FIG. 26 shows three open trades in the account JDEMO for ANEFX (American-New Economy Fund). A trade ID number is assigned to each open trade, as shown. To edit a particular trade, the representative may click on the trade ID number. To sell a specific position, the representative may click on the share amount. To delete a trade, the representative may click on the trash can icon shown to the right. A link is also provided for editing the "ANEFX's" database entry, if desired.

FIG. 27 is a screen shot of a window that is displayed when "View JDEMO's Contact History" hyperlink of FIG. 17 is selected. As indicated above, it is often desirable for a representative to view the contact history between the representative and the customer. FIG. 27 shows an illustrative contact history for the account JDEMO. As can be seen, the representative sent the customer an appraisal on Feb. 2, 2001, met with the customer on Apr. 11, 2001, and called the customer on Apr. 26, 2001. Each of these records was entered by the representative using Go button 250 of FIG. 17.

Figure 28:
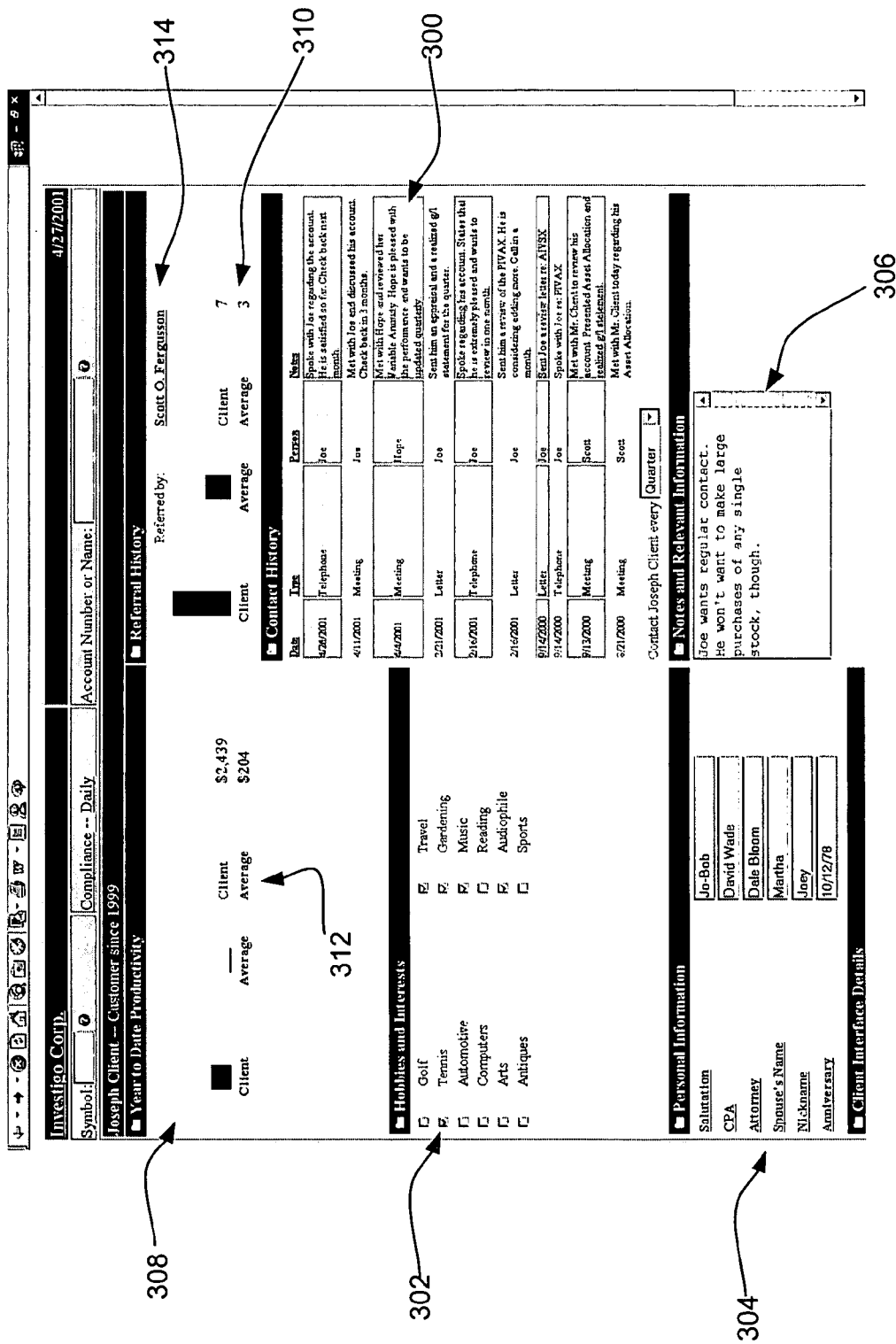
FIG. 28 is a screen shot of an illustrative window that may be displayed when the "Tell Me about" hyperlink of FIG. 17 is selected.

FIG. 28 is a screen shot of an illustrative window that may be displayed when the "Tell Me about" hyperlink of FIG. 17 is selected. The window of FIG. 28 is used to provide the representative with more detailed information about the customer of the selected account. The illustrative window includes a contact history section 300, a hobbies and interest section 302, a personal information section 304, a notes and relevant information section 306, and a referral productivity section 308. The contact history section displays the contact history between the representative and the customer, much like that described above with respect to FIG. 27. The hobbies and interest section 302 allows the representative to record the hobbies and interests of the customer. The personal information section 304 allows the representative to record some personal information about the customer. The notes and relevant information section 306 allows the representative to record any notes or other relevant information regarding the customer or the customer's account. All of these may be useful in developing and maintaining strong customer service and loyalty.

The referral productivity section 308 is shown extending across the top of the illustrative window of FIG. 28. For many representatives, customer referrals are a primary source of business. As such, tracking the productivity of customer referrals is a tool that can be used to increase a representative's business. In the illustrative embodiment, the productivity of customer referrals is computed by storing a customer referral source identifier for each referred customer. For example, Joseph Client was referred to the representative by Scott O. Fergusson, as shown at 314A. A total number of customer referrals for each customer referral source is then computed, along with an average number of customer referrals across all customer referral sources. Referring specifically to the referral productivity section 308 of FIG. 28, the total number of customer referrals referred to the representative by Joseph Customer is seven (7), and the average number of customer referrals across all customer referral sources is three (3), as generally shown at 310. This information is shown both as a bar graph as well as printed data.

Because some customer referrals generate more commission than others, the present invention also contemplates measuring the productivity of customer referrals by commissions received instead of just mere number of referrals. In this illustrative embodiment, a total dollar amount of commissions received by the representative from customers referred from each customer referral source is computed. Then, an average dollar amount is computed for all customer referral sources. Referring again to the referral productivity section 308 of FIG. 28, the total dollar amount of commissions received by the representative from Joseph Customer is $2,439, and the average dollar amount of commissions received by the representative across all customer referral sources is $204, as generally shown at 312. This information is again shown both as a bar graph as well as printed data. As can be seen, Joseph Customer has a much higher referral productivity than the average customer of the representative. This information may indicate to the representative that Joseph Customer is a particularly important customer.

To help identify productive customers, a measure of the relative productivity of any given customer referral source can be determined by comparing the total dollar amount of commissions for a selected customer referral source against the average dollar amount received across all customer referral sources. Alternatively, or in addition, those customer referral sources that are, for example, in the top "n" percent of productivity may be identified and displayed. If desired, the system may output a merge output that includes the particularly productive customer referral sources. The representative may use the merge output to generate, for example, a thank you letter or an invitation to a special event for those customers.

Having thus described the preferred embodiments of the present invention, those of skill in the art will readily appreciate that the teachings found herein may be applied to yet other embodiments within the scope of the claims hereto attached.

What is claimed is:

1. A system for displaying account information from two or more accounts that are stored in one or more account database, wherein each account includes one or more account items, the system comprising:
   [1] a first data structure having two or more associated links, wherein each link identifies one or more of the accounts, and wherein the first data structure, along with the one or more associated links, are user definable;
   [2] display means for simultaneously displaying selected account items from the accounts identified by the two or more links of the first data structure;
   [3] a second data structure having one or more associated links, wherein one of the associated links identifies the first data structure;
   [4] wherein the display means displays selected account items from the accounts identified by the one or more links of the second data structure, including selected account items from the accounts identified by the one or more links of the first data structure.

2. A system according to claim 1 wherein the first data structure is a data structure stored on a data processing system.

3. A system according to claim 1 wherein the display means displays the selected account items in a browser program.

4. A system according to claim 1 wherein the account database is a relational database.

5. A system according to claim 1 wherein each account corresponds to a financial account.

6. A system according to claim 1 wherein more than one account corresponds to a particular customer.

7. A system according to claim 6 further comprising combining means for combining related account items from the more than one accounts before the display means displays the selected account items.

8. A system according to claim 7 wherein the combining means sums related account items from the more than one accounts before the display means displays the selected account items.

9. A system according to claim 6 wherein the one or more associated links of the first data structure identify at least two of the accounts that correspond to the particular customer.

10. A system according to claim 9 further comprising a second data structure having one or more associated links, wherein the one or more links of the second data structure identify at least one of the accounts that correspond to the particular customer.

11. A system according to claim 10 further comprising a third data structure having one or more associated links, wherein the one or more links of the third data structure identify the first data structure and the second data structure.

12. A system according to claim 6 wherein the one or more associated links of the first data structure identify all of the accounts that correspond to the particular customer.

13. A method for displaying account information from two or more accounts that are stored in one or more account database, wherein each account includes one or more account items, the method comprising:
   [1] allowing a user to create a first data structure having two or more associated links, wherein each link identifies one or more of the accounts; and
   [2] simultaneously displaying selected account items from the two or more accounts identified by the two or more links of the first data structure;
   [3] providing a second data structure having one or more associated links, wherein each link identifies one or more of the accounts;
   [4] providing a third data structure having one or more associated links, wherein one of the associated links identifies the first data structure and another one of the associated links identifies the second data structure.

14. A method according to claim 13 wherein the display step displays the selected account items in a browser program.

15. A method according to claim 13 wherein the first data structure is user definable.

16. A method according to claim 13 further comprising the step of providing a second data structure having one or more associated links, wherein one of the associated links identifies the first data structure.

17. A system according to claim 13 wherein more than one account corresponds to a particular customer.

18. A system according to claim 17 further comprising the step of combining related account items from the more than one accounts before the display step displays the selected account items.

19. A method for using a financial services computer program to provide a formatted output of selected fields of a database for a computer program with a merge capability, wherein the database includes a number of database entries each having two or more fields, and each field having a field value, the method comprising:
- operating a financial services computer program that aids financial service professionals in servicing customers, wherein the financial services computer program can access the database, and wherein the two or more fields of each database entry containing customer information;
- providing a query or expression to the financial services computer program;
- identifying the database entries that have one or more fields with a field value that matches the query or expression; and
- outputting a formatted output that includes the field value of a selected field of each database entry identified by the identifying step, wherein the formatted output is formatted as a merge document that can be read by the computer program with the merge capability.

20. A method according to claim 19 wherein the computer program is a word processing program.

21. A method according to claim 19 wherein the computer program is a publishing program.

22. A method according to claim 19 wherein the database is an account database, and selected database entries in the account database correspond to customer accounts, each customer account having a customer name field, a customer address field, and one or more other fields.

23. A method according to claim 22 where the identifying step identifies the customer accounts that have one or more other fields that match the selected value or expression, and the formatted output includes the field value of the customer name field and the customer address field for each customer account identified by the identifying step.

24. A method according to claim 23 wherein the one or more other fields include a birth date.

25. A method according to claim 23 wherein the one or more other fields include an investment objective.

26. A method according to claim 23 wherein the one or more other fields include a security identifier.

27. A method according to claim 23 wherein the one or more other fields include a hobby or interest.

28. A method according to claim 23 wherein the one or more other fields include a net worth value.

29. A method for using a financial services computer program to provide a formatted output of selected fields of a database, wherein the database includes a number of database entries each having two or more fields, and each field having a field value, the method comprising:
- operating a financial services computer program that aids financial service professionals in servicing customers, wherein the financial services computer program can access the database, and wherein the two or more fields of each database entry containing customer information;
- providing a query or expression to the financial services computer program;
- identifying the database entries that have one or more fields with a field value that matches the query or expression; and
- outputting a formatted output that includes the field value of a selected field of each database entry identified by the identifying step, wherein the formatted output is formatted to print onto printed labels, and wherein each of the printed labels is one of an array of printed labels on a sheet of printed labels.

30. A method for using a financial services computer program to provide a formatted output of selected fields of a database, wherein the database includes a number of database entries each having two or more fields, and each field having a field value, the method comprising:
- operating a financial services computer program that aids financial service professionals in servicing customers, wherein the financial services computer program can access the database, and wherein the two or more fields of each database entry containing customer information;
- providing a query or expression to the financial services computer program;
- identifying the database entries that have one or more fields with a field value that matches the query or expression; and
- outputting a formatted output that includes the field value of a selected field of each database entry identified by the identifying step, wherein the formatted output is formatted to be read into a personal digital assistant.

31. A method for accomplishing a stock deposit in a financial services firm having a ledger, the stock deposit being for a specified number of shares of a specified company, the method comprising:
- selecting a customer account having a customer account identifier from a data processing system;
- entering the specified number of shares into the data processing system;
- entering an identifier of the specified security into the data processing system;
- entering at least one stock certificate number into the data processing system;
- generating a stock power that can be readily printed using the customer account identifier, the specified number of shares, the security identifier and the at least one stock certificate number;
- creating an entry in the customer account designated by the customer account number, the entry representing the deposited stock; and
- entering the stock deposit in the blotter of the financial services business.

32. A computer assisted method for determining the productivity of customer referrals from a number of customer referral sources, the method comprising the steps of:
- storing a customer referral source identifier for each referred customer in a database;
- determining a total number of customer referrals for each customer referral source;
- determining an average of the total numbers of customer referrals for all customer referral sources; and
- providing at least a visual comparison of the total number of customer referrals for a selected customer referral source against the average of the total numbers of customer referrals for all customer referral sources.

33. A method according to claim 32 further comprising the steps of:
- identifying selected customer referral sources that have a total number of customer referrals that exceed the average of the total numbers of customer referrals for all customer referral sources.

34. A method according to claim 33 further comprising the step of outputting a formatted output that includes the selected customer referral sources.

35. A method according to claim 34 wherein the formatted output is formatted as a merge document that can be read by a program with a merge capability.

36. A computer assisted method for determining the productivity of customer referrals to an representative or firm from a number of customer referral sources, the method comprising the steps of:

storing a customer referral source identifier for each referred customer in a database;

determining a total dollar amount of commissions made by the representative or firm from customers referred to the representative or firm from each customer referral source;

averaging the total dollar amounts; and providing at least a visual comparison of the total dollar amount for a selected customer referral source with the average total dollar amount for all customer referral sources.

37. A broker dealer assistance system, comprising:

an account database for storing account information, the account information for each account including a number of account holdings, a number of investment objectives and a number of documented customer contacts; and display means for displaying on a single screen or window, or multiple screens or windows simultaneously, selected investment objectives and selected documented customer contacts for a selected account.

38. A broker dealer assistance system according to claim 37 wherein the display means also displays on the single screen or window, or multiple screens or windows simultaneously, selected account holdings.

39. A broker dealer assistance system according to claim 37 wherein the display means also displays on the single screen or window, or multiple screens or windows simultaneously, a number of personal information fields that relate to the selected account.

40. A broker dealer assistance system according to claim 37 wherein the display means also displays on the single screen or window, or multiple screens or windows simultaneously, a report generator option interface.

41. A broker dealer assistance system according to claim 37 wherein the display means also displays on the single screen or window, or multiple screens or windows simultaneously, a securities trade option interface.

42. A broker dealer assistance system according to claim 37 wherein the display means also displays on the single screen or window, or multiple screens or windows simultaneously, a deposit option interface.

43. A method according to claim 29 wherein the database resides on a server and the selected query or expression is identified via a WWW browser.

44. A method according to claim 43 wherein the formatted output is compatible with a word processing program.

\* \* \* \* \*